United States Patent
Schoelkopf et al.

(10) Patent No.: US 12,006,419 B2
(45) Date of Patent: Jun. 11, 2024

(54) MOISTURE-CAPTURING, -STORING, AND/OR -RELEASING COMPOSITION

(71) Applicant: OMYA INTERNATIONAL AG, Oftringen (CH)

(72) Inventors: Joachim Schoelkopf, Oberkulm (CH); Tomasz Ozyhar, Uitkon (CH)

(73) Assignee: Omya International AG, Oftringen (CH)

(*) Notice: Subject to any disclaimer, the term of this patent is extended or adjusted under 35 U.S.C. 154(b) by 603 days.

(21) Appl. No.: 17/272,046

(22) PCT Filed: Sep. 10, 2019

(86) PCT No.: PCT/EP2019/074116
§ 371 (c)(1),
(2) Date: Feb. 26, 2021

(87) PCT Pub. No.: WO2020/053213
PCT Pub. Date: Mar. 19, 2020

(65) Prior Publication Data
US 2021/0347965 A1 Nov. 11, 2021

(30) Foreign Application Priority Data
Sep. 10, 2018 (EP) .................... 18193549

(51) Int. Cl.
| C08K 9/02 | (2006.01) |
| C08K 3/26 | (2006.01) |
| C08L 97/02 | (2006.01) |
| C09C 1/02 | (2006.01) |
| C09K 21/02 | (2006.01) |

(52) U.S. Cl.
CPC ............... *C08K 9/02* (2013.01); *C08K 3/26* (2013.01); *C08L 97/02* (2013.01); *C09C 1/022* (2013.01); *C09K 21/02* (2013.01); *C01P 2004/61* (2013.01); *C01P 2006/12* (2013.01); *C01P 2006/14* (2013.01); *C08K 2003/265* (2013.01); *C08K 2201/005* (2013.01); *C08K 2201/006* (2013.01); *C08L 2201/02* (2013.01); *C08L 2205/16* (2013.01)

(58) Field of Classification Search
CPC ...... C08K 9/02; C08K 3/26; C08K 2003/265; C08K 2201/005; C08K 2201/006; C09C 1/022; C08L 97/02; C08L 2201/02; C08L 2205/16; C01P 2004/61; C01P 2006/12; C01P 2006/14

USPC ......................................................... 524/14
See application file for complete search history.

(56) References Cited

U.S. PATENT DOCUMENTS

| 9,732,205 B2 | 8/2017 | Kuczynski et al. |
| 2004/0020410 A1 | 2/2004 | Gane et al. |
| 2017/0190915 A1* | 7/2017 | Gane .................. B41M 5/0023 |

FOREIGN PATENT DOCUMENTS

| EP | 1665924 A1 * | 6/2006 | ........... A01K 1/0154 |
| EP | 1665924 A1 | 6/2006 | |
| EP | 2264108 A1 | 12/2010 | |
| EP | 2264109 A1 | 12/2010 | |
| EP | 2944621 A1 | 11/2015 | |
| EP | 3189952 A1 | 7/2017 | |
| JP | 04334522 A | 11/1992 | |
| JP | 0626127 A | 2/1994 | |
| JP | 2004105854 A * | 4/2004 | |
| JP | 2004105854 A | 4/2004 | |
| JP | 2017523119 A | 8/2017 | |
| WO | 0039222 A1 | 7/2000 | |
| WO | 2004083316 A1 | 9/2004 | |
| WO | 2005121257 A2 | 12/2005 | |
| WO | 2009074492 A1 | 6/2009 | |
| WO | 2013/069719 A1 | 5/2013 | |
| WO | 2016046051 A1 | 3/2016 | |

OTHER PUBLICATIONS

International Search Report and Written Opinion issued in PCT/EP2019/074116 mailed Dec. 10, 2019.
Gane, P.A.C., Kettle, J.P., Matthews, G.P. and Ridgway, C.J., "Void Space Structure of Compressible Polymer Spheres and Consolidated Calcium Carbonate Paper-Coating Formulations", Industrial and Engineering Chemistry Research, 35(5), pp. 1753-1764, 1996.
Harris, D.C., "Quantitative Chemical Analysis", W.H. Freeman & Co. (USA), 7th Edition, pp. AP11-AP19, 2007.

* cited by examiner

*Primary Examiner* — Hui H Chin
(74) *Attorney, Agent, or Firm* — Heslin Rothenberg Farley Mesiti, P.C.

(57) ABSTRACT

The present invention relates to a composition comprising a first component being an inorganic mineral or mineral-like material having a porous structure, and a second component being a hygroscopic compound; a process for preparing such a composition; a composite material comprising a such a composition; a product comprising such a composition and/or composite material as well as a use of such a composition and/or a composite material as a flame retardant or as a humidity adjusting agent.

19 Claims, 5 Drawing Sheets

MOISTURE-CAPTURING, -STORING, AND/OR -RELEASING COMPOSITION

CROSS REFERENCE TO RELATED APPLICATIONS

Figure 1:
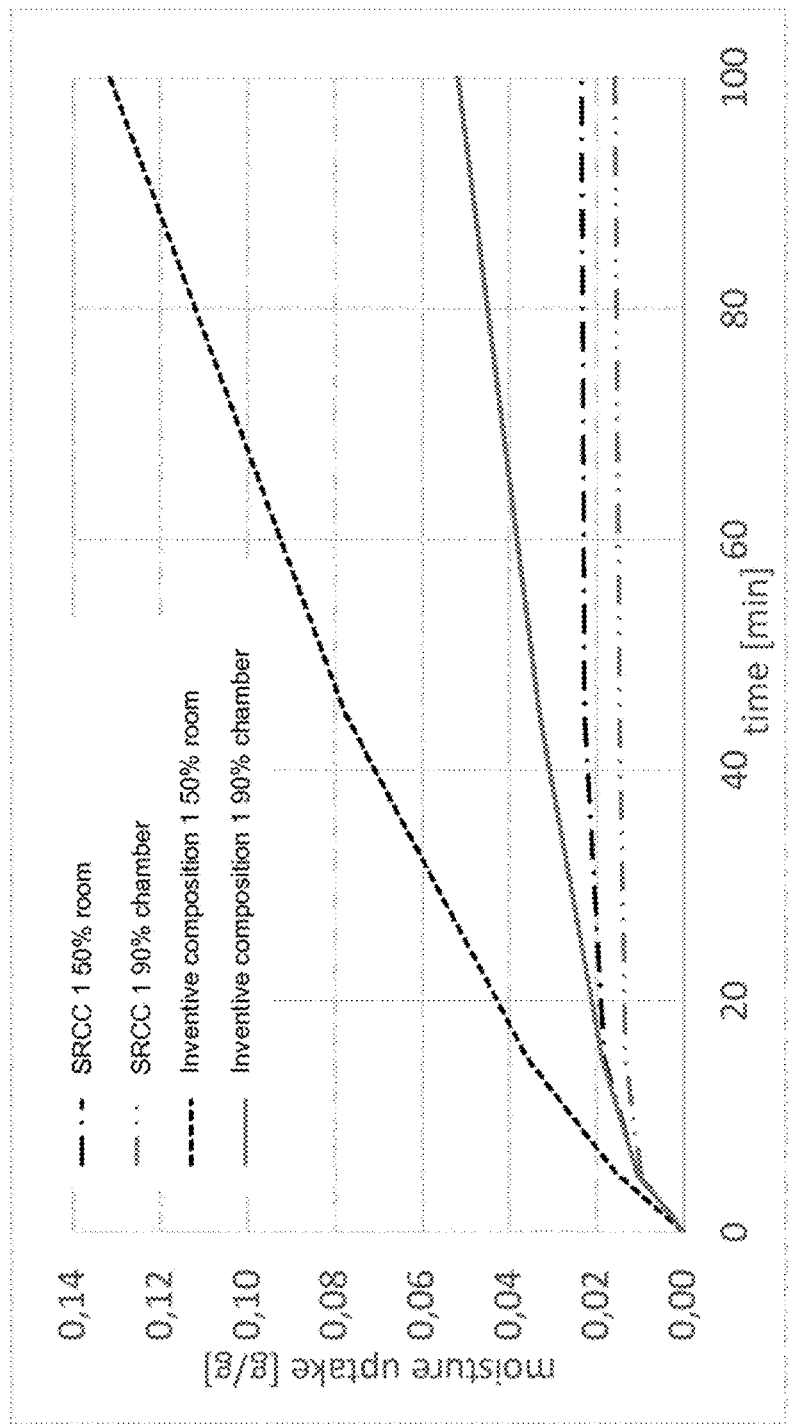

This application is a U.S. National Phase filing under 35 U.S.C. § 371 of International Application PCT/EP2019/074116, filed Sep. 10, 2019, and published as WO 2020/053213 A1 on Mar. 19, 2020. PCT/EP2019/074116 claims priority from European patent application number 18193549.5, filed Sep. 10, 2018. The entire contents of each of these prior applications are hereby incorporated herein by reference.

The present invention relates to a composition comprising a first component being an inorganic mineral or mineral-like material having a porous structure, and a second component being a hygroscopic compound; a process for preparing such a composition; a composite material comprising a such a composition; a product comprising such a composition and/or composite material as well as a use of such a composition and/or a composite material as a flame retardant or as a humidity adjusting agent.

Compositions, which may capture, store and/or release water or moisture, are of interest in a variety of technical fields such as air conditioning, flame retardants, absorbents, humectants, desiccants or packaging.

The application of such materials may vary depending on the technical problem, which needs to be addressed. For example, in fire prevention specific water-storing materials are used. Such water-storing materials remove heat from the fire by endothermically releasing and/or evaporating stored water at an elevated temperature. The release of water or moisture may retard the fire development or, in rare cases, even extinguish the fire source. The endothermic water or moisture release and/or evaporation may also dilute the oxygen content in the direct environment with inert water vapour. Depending on the nature of the water-storing material, the release and/or evaporation of water or moisture can be accompanied by a full decomposition of the material which may contribute to the endothermically heat removal and/or the dilution of oxidizing gases.

Humidity adjusting materials, i.e. moisture-realising and/or moisture-capturing materials, are often incorporated into foodstuff, cosmetics and/or personal care products, or are used for packaging applications. For examples, humectants capture and release water and/or moisture in order to retain moisture in a product. In turn, desiccants are often used to remove water and/or moisture from the surrounding of a moisture-sensitive product. In both cases, the humidity adjusting material is used to avoid a loss of product quality.

Known moisture-capturing, -storing, and/or -releasing compositions are sometimes difficult to handle, display a certain toxicity and/or are too reactive, which limits their use due to their direct exposure to consumables, interior work spaces or living spaces and/or the environment. For example, moisture-capturing, -storing, and/or -releasing silica-based compositions are often suspected to be carcinogenic, if inhaled, and, therefore, are often strictly regulated. Furthermore, known water-capturing, -storing, and/or -releasing materials often have the drawback that they are not easily producible and/or accessible in large quantities and/or from renewable sources. Another disadvantage of known moisture-capturing, -storing, and/or releasing materials may be that the moisture content of such materials may not be adjustable, i.e. that these materials take up or release water or moisture in an uncontrollable manner. In addition, certain materials, which may show a good moisture capturing activity, may have a low stability due to their deliquescent, i.e. due to the fact that these materials dissolve in the captured water and/or moisture. The foregoing limitations of known moisture-capturing, -storing, and/or -releasing compositions may complicate their use for certain technical applications such as humidity adjustment or as a flame retardant.

In view of the above, there remains an interest in developing improved materials, which capture, store and/or release water and/or moisture, if required. Ideally, new materials for such purposes overcome the afore-mentioned disadvantages of comparable materials known in the prior art.

It is one objective of the present invention to provide an improved moisture-capturing, -storing, and/or -releasing composition. It is desirable that the water and/or moisture content of the material is adjustable. It is also desirable that the composition retains its physical form after capturing or releasing of a specific amount of moisture. It is further desirable that the composition is based on easy to handle and/or non-toxic materials. Furthermore, it is desirable that the composition is free of silica and/or silicates. It is also desirable that the composition is easily produced and/or produced from abundant, ideally renewable, raw materials. It is further desirable that the composition may be useful as a humidity adjustment agent and/or a flame retardant.

One or more of the foregoing objectives is achieved by the subject-matter as defined herein in the independent claims.

According to one aspect of the present invention, a composition is provided comprising a first component being an inorganic mineral or mineral-like material having a porous structure, and a second component being a hygroscopic compound.

It has surprisingly been found by the inventors that a composition according to the invention can capture, store and/or release water and/or moisture in an adjustable and controlled manner. The inventive composition is stable, i.e. does not change its aggregation state, upon contacting water or moisture, and is neither toxic, irritant or reactive. Thus, the present invention provides an easy-to-handle and safe composition for capturing, storing and/or releasing water and/or moisture. It was further found that the inventive composition may be used in a variety of technical applications such as flame retardants or humidity adjustment agents.

According to one aspect of the present invention, a process for preparing the inventive composition is provided, the process comprising the steps of:
a) providing a first component being an inorganic mineral or mineral-like material having a porous structure,
b) providing a second component being a hygroscopic compound
c) mixing the first component of step a) with the second component of step b),
d) optionally drying the mixture obtained in step c).

According to one aspect of the present invention, a composite material is provided comprising the inventive composition.

According to one aspect of the present invention, a product is provided comprising the inventive composition and/or the inventive composite material.

According to another aspect of the present invention, a use of the inventive composition and/or the inventive composite material as a flame retardant or as a humidity adjusting agent, preferably as desiccant or humectant, is provided.

Advantageous embodiments of the present invention are defined in the corresponding sub-claims.

According to one embodiment of the invention, the inorganic mineral or mineral-like material is a calcium carbonate-, magnesium carbonate-, calcium phosphate- and/or magnesium phosphate-containing material, preferably a calcium carbonate- and/or magnesium carbonate-containing material, more preferably is a surface-reacted calcium carbonate or a hydromagnesite and most preferably is a surface-reacted calcium carbonate.

According to one embodiment of the invention, the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, preferably the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof, and acidic salts thereof, and more preferably is phosphoric acid.

According to one embodiment of the invention, the second component is present in anhydrous form, or the second component is present in an at least partially hydrated form and/or dissolved form.

According to one embodiment of the invention, the composition is a solid blend, or the first component is impregnated with the second component.

According to one embodiment of the invention, the composition further comprises one or more coating and/or encapsulating agent(s).

According to one embodiment of the invention, the hygroscopic compound is chosen from the group consisting of salts, polyalkylene glycols, polyols, silicon-containing compounds, urea, alpha-hydroxy acids, or polymers, more preferably is a hygroscopic salt, and most preferably is calcium chloride.

According to one embodiment of the invention, the hygroscopic compound in its anhydrous form or partially hydrated form has a moisture pick-up susceptibility from 0.01 to 4.00 g[H2O]/g[compound], preferably from 0.01 to 3.0 g[H2O]/g[compound], more preferably from 0.25 to 2.5 g[H2O]/g[compound], even more preferably from 0.50 to 2.5 g[H2O]/g[compound], and most preferably from 1.0 to 2.0 g[H2O]/g[compound] at equilibrium capacity and at a relative humidity of 50% and at a temperature of +23° C. (±2° C.).

According to one embodiment of the invention, the hygroscopic compound is present in an amount from 1.0 to 90 wt. %, preferably from 5.0 to 75 wt. %, more preferably from 7.5 to 60 wt. %, and most preferably from 10 to 40 wt. %, calculated from the dry weight of the hydroscopic compound and based on the total dry weight of the inorganic mineral or mineral-like material and the hygroscopic compound.

According to one embodiment of the invention, the inorganic mineral or mineral-like material has a median particle size d50 from 1.0 μm to 100 μm, more preferably from 2.0 μm to 80 μm and most preferably from 3.0 μm to 40 μm and/or a specific surface area of from 20 to 200 m2/g, more preferably from 25 to 180 m2/g and most preferably from 30 to 100 m2/g as measured by the BET nitrogen method.

According to one embodiment of the invention, the inorganic mineral or mineral-like material has an intra-particle intruded specific pore volume in the range from 0.1 to 2.3 cm3/g, more preferably from 0.4 to 1.8 cm3/g, and most preferably from 0.6 to 1.6 cm3/g, calculated from mercury porosimetry measurement.

According to one embodiment of the invention, the composition has a total moisture content in the range from 1.0 to 90 wt. %, preferably from 2.5 to 75 wt. %, more preferably from 5.0 to 60 wt. %, and most preferably from 10 to 50 wt. %, based on the total weight of the composition.

According to one embodiment of the invention, step c) refers to one or more solid blending step(s), and preferably the second component of step b) is provided in anhydrous form or in partially hydrated form, or step c) refers to one or more impregnating step(s), and preferably the first component of step a) is provided in solid form or in form of an aqueous suspension, more preferably in solid form, and preferably the second component of step b) is provided in liquid form, more preferably in form of an aqueous solution.

According to one embodiment of the invention, the process further comprises the steps of:
f) providing a coating and/or encapsulating agent
g) mixing the coating and/or encapsulating agent of step f) with the mixture obtained in step c) or d).

According to one embodiment of the invention, the composite material further comprises one or more materials selected from polymers, organic fibres, binders or resins, and preferably the composite material further comprises a resin or a combination of a resin and organic fibres.

According to one embodiment of the invention, the composition and/or the composite material is present throughout the whole product or is only present in at least one part of the product, preferably in a surface or surface-near layer of the product.

According to one embodiment of the invention, the product is a wood-based board, a humectant or a desiccant, and preferably a wood-based board, more preferably a fibre or particle board, and most preferably a particle board, a high-density fibre (HDF) board, medium-density fibre (MDF) board, low-density fibre (LDF) board, an oriented strand board (OSB), a hardboard, or an insulation board.

According to one embodiment of the invention, the flame retardant is part of a flame resistant product, preferably a flame resistant wood-based board, more preferably a flame resistant fibre or particle board, and most preferably a particle board, high-density fibre (HDF) board, medium-density fibre (MDF) board, low-density fibre (LDF) board, oriented strand board (OSB), hardboard, or an insulation board.

It should be understood that for the purpose of the present invention, the following terms have the following meaning.

A "porous structure" in the meaning of the present invention is a structure of a solid having interconnected pores, cavities, channels and/or interstices with a diameter of at least 0.2 nm, preferably from 0.2 nm to 2000 nm, and being accessible to external liquids and/or gases. Preferably, an inorganic mineral or mineral-like material having a porous structure as described herein is characterized by showing a measurable volume of intruded mercury using a mercury intrusion/extrusion porosimeter such as the Micromeritics Autopore III.

A "hygroscopic compound" in the meaning of the present invention is a compound, which in its anhydrous or partially hydrated form can bind water molecules form its surrounding. For example, the water molecules may be bound by the hygroscopic compound by absorption and/or absorption, and may be accompanied by a change in molecular structure and/or physical properties. Preferably, a hygroscopic compound according to the present invention in its anhydrous or partially hydrated form has a moisture pick-up susceptibility of 0.01 to 4.00 g[H2O]/g[compound], more preferably from 0.01 to 3.0 g[H2O]/g[compound], even more preferably from 0.25 to 2.5 g[H2O]/g[compound], even more preferably from 0.50 to 2.5 g[H2O]/g[compound], and most preferably from 1.0 to 2.0 g[H2O]/g[compound], at equilibrium capacity and at a relative humidity of 50% and at a temperature of +23° C. (±2° C.).

The "anhydrous form" of a hygroscopic compound according to the present invention refers to a hygroscopic compound, which has essentially no or very little water molecules bound.

The "partially hydrated form" of a hygroscopic compound according to the present invention refers to non-anhydrous hygroscopic compound, i.e. a hygroscopic compound, which has already been exposed to water and/or moisture, but which is still capable of ab- and/or absorbing water molecules from its surrounding.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 5 cm3 chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764).

For the purpose of the present invention, an "acid" is defined as Brønsted-Lowry acid, that is to say, it is an H3O+ ion provider. An "acid salt" is defined as an H3O+ ion-provider, e.g., a hydrogen-containing salt, which is partially neutralised by an electropositive element. A "salt" is defined as an electrically neutral ionic compound formed from anions and cations. A "partially crystalline salt" is defined as a salt that, on XRD analysis, presents an essentially discrete diffraction pattern.

In accordance with the present invention, pKa, is the symbol representing the acid dissociation constant associated with a given ionisable hydrogen in a given acid, and is indicative of the natural degree of dissociation of this hydrogen from this acid at equilibrium in water at a given temperature. Such pKa values may be found in reference textbooks such as Harris, D. C. "Quantitative Chemical Analysis: 3rd Edition", 1991, W.H. Freeman & Co. (USA), ISBN 0-7167-2170-8.

"Ground calcium carbonate" (GCC) in the meaning of the present invention is a calcium carbonate obtained from natural sources, such as limestone, marble, dolomite, or chalk, and processed through a wet and/or dry treatment such as grinding, screening and/or fractionating, for example, by a cyclone or classifier.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form.

For the purpose of the present invention, a "surface-reacted calcium carbonate" is a material comprising calcium carbonate and an insoluble, at least partially crystalline, non-carbonate calcium salt, preferably, extending from the surface of at least part of the calcium carbonate. The calcium ions forming said at least partially crystalline non-carbonate calcium salt originate largely from the starting calcium carbonate material that also serves to form the surface-reacted calcium carbonate core. Such salts may include OH— anions and/or crystal water.

In the meaning of the present invention "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of recovered solid material following evaporation at 95 to 100° C. of 100 g of said liquid filtrate.

Throughout the present document, the "particle size" of a calcium carbonate and other materials is described by its distribution of particle sizes. The value dx represents the diameter relative to which x % by weight of the particles have diameters less than dx. This means that the d20 value is the particle size at which 20 wt.-% of all particles are smaller, and the d75 value is the particle size at which 75 wt.-% of all particles are smaller. The d50 value is thus the weight median particle size, i.e. 50 wt.-% of all grains are bigger or smaller than this particle size. For the purpose of the present invention the particle size is specified as weight median particle size d50 unless indicated otherwise. For determining the weight median particle size d50 value a Sedigraph can be used. For the purpose of the present invention, the "particle size" of surface-reacted calcium is described as volume determined particle size distributions. For determining the volume determined particle size distribution, e.g., the volume median grain diameter (d50) or the volume determined top cut particle size (d98) of surface-reacted calcium carbonate, a Malvern Mastersizer 2000 can be used. The weight determined particle size distribution may correspond to the volume determined particle size if the density of all the particles is equal.

A "specific surface area (SSA)" of a calcium carbonate in the meaning of the present invention is defined as the surface area of the calcium carbonate divided by its mass. As used herein, the specific surface area is measured by nitrogen gas adsorption using the BET isotherm (ISO 9277:2010) and is specified in m2/g.

For the purpose of the present invention, the term "viscosity" or "Brookfield viscosity" refers to Brookfield viscosity. The Brookfield viscosity is for this purpose measured by a Brookfield (Type RVT) viscometer at 20° C.±2° C. at 100 rpm using an appropriate spindle and is specified in mPa·s.

A "suspension" or "slurry" in the meaning of the present invention comprises insoluble solids and water, and optionally further additives, and usually contains large amounts of solids and, thus, is more viscous and can be of higher density than the liquid from which it is formed.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The inventive composition comprises a first component being an inorganic mineral or mineral-like material having a porous structure, and a second component being a hygroscopic compound.

In the following details and preferred embodiments of the inventive composition will be set out in more detail. It is to be understood that these technical details and embodiments also apply to the inventive process for producing said composition, the inventive composite material comprising said composition, the inventive product comprising said composite material and/or said composition and the inventive use of said composition and/or said composite material.

1. The Composition According to the Invention

The First Component

It is one requirement that the inventive composition comprises a first component being an inorganic mineral or mineral-like material having a porous structure.

The first component is now described in further detail. The terms "first component" and "inorganic mineral or mineral-like material" are used interchangeably. Thus, all embodiments, which refer to the "first component" are also disclosed for "inorganic mineral or mineral-like material" and vice versa.

It is understood that the inorganic mineral or mineral-like material according to the present invention is present in the inventive composition in solid form.

According to one embodiment, the first component is an inorganic mineral material. The inorganic mineral material may be selected from any one of the inorganic mineral materials known in the art as long as the inorganic mineral material has a porous structure.

According to an alternative embodiment, the first component is an inorganic mineral-like material. An "inorganic mineral-like material" in the meaning of the present invention is an inorganic material, which does not occur naturally. For example, an inorganic mineral-like material may be a synthetic inorganic salt such as precipitated calcium carbonate.

Inorganic mineral or mineral-like materials with certain physical properties are preferred for the present invention.

According to one embodiment, the inorganic mineral or mineral-like material has a median particle size d50 from 1.0 μm to 100 μm, more preferably from 2.0 μm to 80 μm and most preferably from 3.0 μm to 40 μm.

According to one embodiment, the inorganic mineral or mineral-like material has a specific surface area of from 20 to 200 m2/g, more preferably from 25 to 180 m2/g and most preferably from 30 to 100 m2/g as measured by the BET nitrogen method.

According to a preferred embodiment of the invention, the inorganic mineral or mineral-like material has a median particle size d50 from 1.0 μm to 100 μm, more preferably from 2.0 μm to 80 μm and most preferably from 3.0 μm to 40 μm and a specific surface area of from 20 to 200 m2/g, more preferably from 25 to 180 m2/g and most preferably from 30 to 100 m2/g as measured by the BET nitrogen method.

According to one embodiment, the inorganic mineral or mineral-like material has an intra-particle intruded specific pore volume in the range from 0.1 to 2.3 cm3/g, more preferably from 0.4 to 1.8 cm3/g, and most preferably from 0.6 to 1.6 cm3/g, calculated from mercury porosimetry measurement.

Certain inorganic mineral or mineral-like materials are preferred for the present invention.

According to a preferred embodiment, the inorganic mineral or mineral-like material is a calcium carbonate-, magnesium carbonate-, calcium phosphate- and/or magnesium phosphate-containing material, and more preferably a calcium carbonate- and/or magnesium carbonate-containing material.

The first component may be essentially free of silica- and/or silicate-containing materials. Thus, according to one preferred embodiment, the first component does not contain a silica- and/or silicate-containing material.

According to one embodiment, the inorganic mineral or mineral-like material is a calcium phosphate-containing material. For example, the calcium phosphate-containing material may contain octacalcium phosphate, hydroxylapatite, chlorapatite, fluorapatite, carbonate apatite and mixtures thereof, and preferably is a hydroxylapatite-containing material.

Furthermore, the calcium phosphate-containing material may be a natural or a synthetic calcium phosphate-containing material. For example, a synthetic calcium phosphate-containing material may be a precipitated calcium phosphate-containing material. One option to produce a precipitated calcium phosphate-containing material is by reacting a natural or synthetic calcium carbonate with phosphoric acid.

According to one preferred embodiment, the inorganic mineral or mineral-like material is a precipitated calcium phosphate-containing material, and more preferably a surface-reacted calcium carbonate, wherein the surface-reacted calcium carbonate is a reaction product of natural ground calcium carbonate or precipitated calcium carbonate with carbon dioxide and one or more H3O+ ion donors, wherein the carbon dioxide is formed in situ by the H3O+ ion donors treatment and/or is supplied from an external source, and wherein the H3O+ ion donor is phosphoric acid.

According to another embodiment, the inorganic mineral or mineral-like material is a magnesium phosphate-containing material.

According to another embodiment, the inorganic mineral or mineral-like material is a calcium carbonate-containing material. For example, the calcium carbonate-containing material may be a natural ground calcium carbonate, a precipitated calcium carbonate, a surface-reacted calcium carbonate, or mixtures thereof.

According to another embodiment, the inorganic mineral or mineral-like material is a magnesium carbonate-containing material. For example, the magnesium carbonate-containing material may be hydromagnesite, upsalite or hydrotalcite.

It is to be understood that the inorganic mineral or mineral-like material may also be a material, which contains a calcium carbonate- and magnesium carbonate-containing material. Alternatively, the inorganic mineral or mineral-like material may be a material, which contains a calcium carbonate- and calcium phosphate-containing material.

According to another preferred embodiment, the inorganic mineral or mineral-like material is a calcium carbonate- and/or calcium phosphate-containing material.

Certain materials from the group consisting of calcium carbonate- and/or magnesium carbonate-containing materials are more preferred for the present invention.

According to a preferred embodiment, the inorganic mineral or mineral-like material is a surface-reacted calcium carbonate or a hydromagnesite, and preferably is a surface-reacted calcium carbonate.

Thus, according to one embodiment of the present invention, the inorganic mineral or mineral-like material is a hydromagnesite. Hydromagnesite is defined by the chemical formula $Mg_5(CO_3)_4(OH)_2 \cdot 4H_2O$ and is well-known to the skilled person. The hydromagnesite may be used in any form available. According to one embodiment, the hydromagnesite is a naturally occurring hydromagnesite or a synthetic hydromagnesite. According to a preferred embodiment, the hydromagnesite is a synthetic, and more preferably a precipitated, hydromagnesite.

According to one embodiment, the inorganic mineral or mineral-like material is a hydromagnesite and has median particle size d50 from 1.0 μm to 100 μm, more preferably from 2.0 μm to 80 μm and most preferably from 3.0 μm to 40 μm.

According to one embodiment, the inorganic mineral or mineral-like material is a hydromagnesite and has median particle size d50 from 1.0 μm to 100 μm, more preferably from 2.0 μm to 80 μm and most preferably from 3.0 μm to 40 μm and a specific surface area of from 20 to 200 m2/g, more preferably from 25 to 180 m2/g and most preferably from 30 to 100 m2/g as measured by the BET nitrogen method.

According to one embodiment, the inorganic mineral or mineral-like material is a hydromagnesite and has an intra-particle intruded specific pore volume in the range from 0.1 to 2.3 cm3/g, more preferably from 0.4 to 1.8 cm3/g, and most preferably from 0.6 to 1.6 cm3/g, calculated from mercury porosimetry measurement. For example, the inorganic mineral or mineral-like material is a hydromagnesite and has an intra-particle intruded specific pore volume in the range from 0.5 to 1.0 cm3/g, calculated from mercury porosimetry measurement.

As set out above, a particularly preferred inorganic mineral or mineral-like material according to the present invention is a surface-reacted calcium carbonate.

According to a preferred embodiment of the present invention, the surface-reacted calcium carbonate is a reaction product of natural ground calcium carbonate or precipitated calcium carbonate with carbon dioxide and one or more H3O+ ion donors, wherein the carbon dioxide is formed in situ by the H3O+ ion donors treatment and/or is supplied from an external source, preferably the at least one H3O+ ion donor is selected from the group consisting of hydrochloric acid, sulphuric acid, sulphurous acid, phosphoric acid, citric acid, oxalic acid, an acidic salt, acetic acid, formic acid, and mixtures thereof, and acidic salts thereof, and more preferably is phosphoric acid.

In a preferred embodiment of the invention the surface-reacted calcium carbonate is obtained by a process comprising the steps of: (a) providing a suspension of natural or precipitated calcium carbonate, (b) adding at least one acid having a pKa value of 0 or less at 20° C. or having a pKa value from 0 to 2.5 at 20° C. to the suspension of step a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous CO2, (D) contacting said natural or precipitated calcium carbonate of step (A) with the at least one acid of step (B) and with the CO2 of step (C), characterised in that: (i) the at least one acid of step B) has a pKa of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a pKa of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural ground calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$) and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or wormlike form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one H3O+ ion donor by the same means as used for grinding natural calcium carbonate as described above.

According to one embodiment of the present invention, the natural ground calcium carbonate or precipitated calcium carbonate is in form of particles having a weight median particle size d50 of 0.05 to 10.0 µm, preferably 0.2 to 5.0 µm, and most preferably 0.4 to 3.0 µm. According to a further embodiment of the present invention, the natural ground calcium carbonate or precipitated calcium carbonate is in form of particles having a weight top cut particle size d98 of 0.15 to 30 µm, preferably 0.6 to 15 µm, more preferably 1.2 to 10 µm, most preferably 1.5 to 4 µm, especially 1.6 µm.

The natural ground calcium carbonate and/or precipitated calcium carbonate may be used dry or suspended in water. Preferably, a corresponding slurry has a content of natural ground calcium carbonate or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more H3O+ ion donor used for the preparation of surface-reacted calcium carbonate may be any strong acid, medium-strong acid, or weak acid, or mixtures thereof, generating H3O+ ions under the preparation conditions. According to the present invention, the at least one H3O+ ion donor can also be an acid salt, generating H3O+ ions under the preparation conditions.

According to one embodiment, the at least one H3O+ ion donor is a strong acid having a pKa of 0 or less at 20° C.

According to another embodiment, the at least one H3O+ ion donor is a medium-strong acid having a pKa value from 0 to 2.5 at 20° C. If the pKa at 20° C. is 0 or less, the acid is preferably selected from sulphuric acid, hydrochloric acid, or mixtures thereof. If the pKa at 20° C. is from 0 to 2.5, the H3O+ ion donor is preferably selected from H2SO3, H3PO4, oxalic acid, or mixtures thereof. The at least one H3O+ ion donor can also be an acid salt, for example, HSO4− or H2PO4−, being at least partially neutralized by a corresponding cation such as Li+, Na+ or K+, or HPO42−, being at least partially neutralised by a corresponding cation such as Li+, Na+, K+, Mg2+ or Ca2+. The at least one H3O+ ion donor can also be a mixture of one or more acids and one or more acid salts.

According to still another embodiment, the at least one H3O+ ion donor is a weak acid having a pKa value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a pKa of greater than 7, when measured at 20° C., associated with the ionisation of the first available hydrogen, and the salt anion of which is capable of forming water-insoluble calcium salts, is additionally provided. According to the preferred embodiment, the weak acid has a pKa value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one H3O+ ion donor is selected from the group consisting of hydrochloric acid, sulphuric acid, sulphurous acid, phosphoric acid, citric acid, oxalic acid, acetic acid, formic acid, and mixtures thereof. Preferably the at least one H3O+ ion donor is selected from the group consisting of hydrochloric acid, sulphuric acid, sulphurous acid, phosphoric acid, oxalic acid, H2PO4−, being at least partially neutralised by a corresponding cation such as Li+, Na+ or K+, HPO42−, being at least partially neutralised by a corresponding cation such as Li+, Na+, K+, Mg2+, or Ca2+ and mixtures thereof, more preferably the at least one acid is selected from the group consisting of hydrochloric acid, sulphuric acid, sulphurous acid, phosphoric acid, oxalic acid, or mixtures thereof, and most preferably, the at least one H3O+ ion donor is phosphoric acid.

The one or more H3O+ ion donor can be added to the suspension as a concentrated solution or a more diluted solution. Preferably, the molar ratio of the H3O+ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the H3O+ ion donor to the water before the natural or precipitated calcium carbonate is suspended.

In a next step, the natural ground calcium carbonate or precipitated calcium carbonate is treated with carbon dioxide. If a strong acid such as sulphuric acid or hydrochloric acid is used for the H3O+ ion donor treatment of the natural ground calcium carbonate or precipitated calcium carbonate, the carbon dioxide is automatically formed. Alternatively or additionally, the carbon dioxide can be supplied from an external source.

H3O+ ion donor treatment and treatment with carbon dioxide can be carried out simultaneously which is the case when a strong or medium-strong acid is used. It is also possible to carry out H3O+ ion donor treatment first, e.g. with a medium strong acid having a pKa in the range of 0 to 2.5 at 20° C., wherein carbon dioxide is formed in situ, and thus, the carbon dioxide treatment will automatically be carried out simultaneously with the H3O+ ion donor treatment, followed by the additional treatment with carbon dioxide supplied from an external source.

Preferably, the concentration of gaseous carbon dioxide in the suspension is, in terms of volume, such that the ratio (volume of suspension):(volume of gaseous CO2) is from 1:0.05 to 1:20, even more preferably 1:0.05 to 1:5.

In a preferred embodiment, the H3O+ ion donor treatment step and/or the carbon dioxide treatment step are repeated at least once, more preferably several times. According to one embodiment, the at least one H3O+ ion donor is added over a time period of at least about 5 min, typically from about 5 to about 30 min. Alternatively, the at least one H3O+ ion donor is added over a time period of about 30 min, preferably about 45 min, and sometimes about 1 h or more.

Subsequent to the H3O+ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

It is appreciated that the H3O+ ion donor treatment and treatment with carbon dioxide can be carried over a wide temperature range. Preferably, the H3O+ ion donor treatment and treatment with carbon dioxide can be carried out at room temperature or elevated temperature. For example, if the H3O+ ion donor treatment and treatment with carbon dioxide is carried out at elevated temperature, the treatment is preferably in a range from 30 to 90° C., more preferably from 40 to 80° C. and most preferably from 50 to 80° C., such as from 60 to 80° C.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with H3O+ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by H3O+ ions, where said H3O+ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said H3O+ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural ground calcium carbonate or precipitated calcium carbonate, the natural ground calcium carbonate or precipitated calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural ground calcium carbonate or precipitated calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with an acid and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural ground calcium carbonate or precipitated calcium carbonate in the form of granules or a powder.

The surface-reacted calcium carbonate may have different particle shapes, such as e.g. the shape of roses, golf balls and/or brains.

According to one embodiment, the surface-reacted calcium carbonate has a specific surface area of from 20 m2/g to 200 m2/g, preferably from 25 m2/g to 180 m2/g, and most preferably from 30 m2/g to 100 m2/g, measured using nitrogen and the BET method. The BET specific surface area in the meaning of the present invention is defined as the surface area of the particles divided by the mass of the particles. As used therein the specific surface area is measured by adsorption using the BET isotherm (ISO 9277: 2010) and is specified in m2/g.

According to one embodiment the surface-reacted calcium carbonate has a median particle size d50 from 1.0 to 100 µm, more preferably from 2.0 to 80 µm, and most preferably from 3.0 to 40 µm.

It may furthermore be preferred that the surface-reacted calcium carbonate particles have a volume top cut particle size d98 of from 2 to 150 µm, preferably from 4 to 100 µm, more preferably 6 to 80 µm, even more preferably from 8 to 60 µm, and most preferably from 8 to 30 µm.

The value dx represents the diameter relative to which x % of the particles have diameters less than dx. This means that the d98 value is the particle size at which 98% of all particles are smaller. The d98 value is also designated as "top cut". The dx values may be given in volume or weight percent. The d50 (wt) value is thus the weight median particle size, i.e. 50 wt.-% of all grains are smaller than this particle size, and the d50 (vol) value is the volume median particle size, i.e. 50 vol. % of all grains are smaller than this particle size.

Volume median grain diameter d50 was evaluated using a Malvern Mastersizer 2000 Laser Diffraction System. The d50 or d98 value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine grain size of fillers and pigments.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 5 cm3 chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-reacted calcium carbonate has an intra-particle intruded specific pore volume in the range from 0.1 to 2.3 cm3/g, more preferably from 0.2 to 2.0 cm3/g, especially preferably from 0.4 to 1.8 cm3/g and most preferably from 0.6 to 1.6 cm3/g, calculated from mercury porosimetry measurement. For example, the surface-reacted calcium carbonate has an intra-particle intruded specific pore volume in the range from 0.5 to 1.0 cm3/g, calculated from mercury porosimetry measurement.

The intra-particle pore size of the surface-reacted calcium carbonate preferably is in a range of from 0.004 to 1.6 μm, more preferably in a range of between 0.005 to 1.3 μm, especially preferably from 0.006 to 1.15 μm and most preferably of 0.007 to 1.0 μm, e.g. 0.004 to 0.16 μm determined by mercury porosimetry measurement.

According to an exemplary embodiment, the surface-reacted calcium carbonate has a volume median particle size d50 from 3.0 to 40 μm, preferably from 4 to 6 μm; a specific surface-area of from 30 to 100 m2/g, preferably from 60 to 100 m2/g, measured using nitrogen and the BET method; and an intra-particle intruded specific pore volume from 0.2 to 2.0 cm3/g, preferably from 0.6 to 1.6 cm3/g, calculated from mercury porosimetry measurement.

Due to the intra and interpore structure of the surface-reacted calcium carbonate, it can be a superior agent to deliver previously adsorbed and/or absorbed materials over time relative to common materials having similar specific surface areas. Thus, generally, any agent fitting into the intra- and/or inter particle pores of the surface-reacted calcium carbonate is suitable to be transported by the surface-reacted calcium carbonate according to the invention. For example, active agents such as those selected from the group comprising pharmaceutically active agents, biologically active agents, disinfecting agents, preservatives, flavouring agents, surfactants, oils, fragrances, essential oils, and mixtures thereof can be used.

According to one embodiment, at least one active agent is associated with the surface-reacted calcium carbonate.

According to one embodiment of the present invention, the surface-reacted calcium carbonate comprises a water-insoluble, at least partially crystalline calcium salt of an anion of the at least one acid, which is formed on the surface of the natural ground calcium carbonate or precipitated calcium carbonate. According to one embodiment, the water-insoluble, at least partially crystalline salt of an anion of the at least one acid covers the surface of the natural ground calcium carbonate or precipitated calcium carbonate at least partially, preferably completely. Depending on the employed at least one acid, the anion may be sulphate, sulphite, phosphate, citrate, oxalate, acetate, form iate and/or chloride.

None of the reaction products formed by the reaction of natural ground calcium carbonate or precipitated calcium carbonate with carbon dioxide and one or more H3O+ ion donors, is a hygroscopic compound according to the invention. For example, it is understood that the water-insoluble, at least partially crystalline calcium salt of an anion of the at least one acid, which may be present in the surface-reacted calcium carbonate, is not a hygroscopic compound according to the invention. Thus, according to one embodiment, the surface-reacted calcium carbonate does not contain a hygroscopic compound, and preferably does not contain calcium chloride. According to one embodiment, the water-insoluble, at least partially crystalline calcium salt of an anion of the at least one acid is not a hygroscopic compound, and preferably is not calcium chloride.

For example, the use of phosphoric acid, H2PO4− or HPO42− as the H3O+ ion donor may lead to the formation of hydroxylapatite. Therefore, in a preferred embodiment, the at least one water-insoluble calcium salt is hydroxylapatite.

According to one embodiment, the at least one water-insoluble calcium salt is hydroxylapatite, wherein the surface-reacted calcium carbonate provides a ratio of hydroxylapatite to calcite, aragonite and/or vaterite, preferably to calcite, in the range of from 1:99 to 99:1 by weight.

Preferably, the surface-reacted calcium carbonate may provide a ratio of hydroxylapatite to calcite, aragonite and/or vaterite, preferably to calcite, in the range of from 1:9 to 9:1, preferably 1:7 to 8:1, more preferably 1:5 to 7:1 and most preferably 1:4 to 7:1 by weight.

In a similar manner, the use of other H3O+ ion donors may lead to the formation of corresponding water-insoluble calcium salts other than calcium carbonate on at least part of the surface of the surface-reacted calcium carbonate. In one embodiment, the at least one water-insoluble calcium salt is thus selected from the group consisting of octacalcium phosphate, hydroxylapatite, chlorapatite, fluorapatite, carbonate apatite and mixtures thereof, wherein the surface-reacted calcium carbonate shows a ratio of the at least one water-insoluble calcium salt to calcite, aragonite and/or vaterite, preferably to calcite, in the range of from 1:99 to 99:1, preferably from 1:9 to 9:1, more preferably from 1:7 to 8:1, even more preferably from 1:5 to 7:1 and most preferably from 1:4 to 7:1 by weight.

According to one embodiment the surface-reacted calcium carbonate comprises:
(i) a specific surface area of from 20 to 200 m$^2$/g measured using nitrogen and the BET method according to ISO 9277:2010, and
(ii) an intra-particle intruded specific pore volume in the range of from 0.1 to 2.3 cm$^3$/g calculated from mercury porosimetry measurement.

In one embodiment of the present invention, the surface-reacted calcium carbonate as described herein is provided in the form of granules. "Granules" in the meaning of the present invention are agglomerates of the surface-reacted calcium carbonate and have a particle size of 20 to 300 μm. That is to say, the granules having a particle size of 20 to 300 μm comprise primary particles of the surface-reacted calcium carbonate having a volume median particle size d50 from 0.1 to 90 μm.

The Second Component

It is one requirement that the inventive composition comprises a second component being a hygroscopic compound.

The second component is now described in further detail. The terms "second component" and "hygroscopic compound" are used interchangeably. Thus, all embodiments, which refer to the "second component" are also disclosed for "hygroscopic compound" and vice versa.

The hygroscopic compound may be present in the inventive composition in different forms, i.e. having different water content, depending on the amount of water molecules, which have been absorbed and/or adsorbed by the hygroscopic compound. For example, the hygroscopic compound may be present in anhydrous form, in partially or fully hydrated form, in dissolved form, or in mixtures of these forms.

Furthermore, the hygroscopic compound may be present in solid or in liquid form. If the hygroscopic compound is present in solid form, the compound may be either present in anhydrous form, in partially or fully hydrated form, or in mixtures of these forms. Thus, term "solid" hygroscopic compound as used in the present invention does not indicate the water content of the hygroscopic compound, but the aggregation state thereof. Similarly, a liquid hygroscopic compound may be present in anhydrous form, for example, if the hygroscopic compound is a liquid per se, as it is the case with glycerol. The liquid hygroscopic compound may also be present in partially or fully hydrated form, or in dissolved form. Thus, the term "liquid" hygroscopic compound as used in the present invention does not indicate the water content of the hygroscopic compound, but its aggregation state.

According to one embodiment, the hygroscopic compound is present in anhydrous form, in at least partially hydrated form, in dissolved form, or in mixtures of these forms.

Water and/or moisture uptake by a hygroscopic compound is well-known to the skilled person. The skilled person will also know that hygroscopic compounds may capture and/or store water molecules via different mechanisms. For example, the hygroscopic compound may incorporate water molecules in its crystal lattice. Additionally or alternatively, water and/or moisture may be ad- and/or absorbed by the hygroscopic compound.

According to one embodiment of the present invention, the hygroscopic compound is present in anhydrous form. In view of the above definition of "anhydrous form" of the hygroscopic compound, a skilled person will understand the characteristics of an anhydrous hygroscopic compound. In particular, a skilled person understands that "anhydrous form" does not mean that not a single water molecule is present.

According to a preferred embodiment of the present invention, the hygroscopic compound is present in at least partially hydrated form.

For example, the hygroscopic compound is present in partially hydrated form. A hygroscopic compound is partially hydrated, if it has been contacted with water and/or moisture. In view of the definition above, it is understood that "partially hydrated" in the meaning of the present invention refers to a hygroscopic compound, which is not saturated with moisture and may still capture further water and/or moisture from its surrounding.

According to another preferred embodiment, the hygroscopic compound is present in fully hydrated form. Thus, hygroscopic compound may be saturated with water and/or moisture, i.e. the compound may be in a state, wherein no more water and/or moisture will be captured from the surrounding.

In another preferred embodiment, the hygroscopic compound is present in dissolved form, more preferably in form of an aqueous solution. In such case, the hygroscopic compound may be dissolved in the water and/or moisture captured from the surrounding. For example, this may be the case, if the hygroscopic compound is also a deliquescent compound. Additionally or alternatively, the hygroscopic compound may also be dissolved in an intentionally added solvent such as water.

Furthermore, it is possible that the hygroscopic compound is present in more than one of the above-described forms. For example, the hygroscopic compound may be present in partially hydrated and fully hydrated form, or the hygroscopic compound may be present in partially hydrated, fully hydrated form and in form of an aqueous solution.

The hygroscopic compound may be defined by its moisture pick-up susceptibility. According to one embodiment of the present invention, the hygroscopic compound in its anhydrous form or partially hydrated form has a moisture pick-up susceptibility from 0.01 to 4.00 g[H2O]/g[compound], preferably from 0.01 to 3.0 g[H2O]/g[compound], more preferably from 0.25 to 2.5 g[H2O]/g[compound], even more preferably from 0.50 to 2.5 g[H2O]/g[compound], and most preferably from 1.0 to 2.0 g[H2O]/g[compound] at equilibrium capacity and at a relative humidity of 50% and at a temperature of +23° C. (±2° C.). Methods for determining the moisture pick-up susceptibility are well-known in the art.

The second component according to the present invention may be any hygroscopic compound known in the prior art.

According to a preferred embodiment, the hygroscopic compound is chosen from the group consisting of salts, polyalkylene glycols, polyols, silicon-containing compounds, urea, alpha-hydroxy acids, or polymers.

According to one embodiment, the hygroscopic compound is a polyalkylene glycol. Hygroscopic polyalkylene glycols are known in the art.

According to one embodiment, the hygroscopic compound is a polyol. A "polyol" in the meaning of the present invention is a compound comprising two or more hydroxyl groups. For example, suitable polyols are propylene glycol, ethylene glycol, butylene glycol or sugar alcohols, preferably glycerol, sorbitol, xylitol or maltitol.

According to one embodiment, the hygroscopic compound is a silicon-containing compound. Preferred hygroscopic silicon-containing compounds are zeolites.

Although certain silicon-containing compounds may be preferred as the second component according to the invention, the second component may be essentially free of silica- and/or silicate-containing materials. Thus, according to another preferred embodiment, the second component does not contain a silica- and/or silicate-containing material.

In one embodiment, the first and second component do not contain a silica- and/or silicate-containing material.

According to one embodiment, the hygroscopic compound is urea.

According to one embodiment, the hygroscopic compound is an alpha-hydroxy acid such as lactic acid.

According to one embodiment, the hygroscopic compound is a hygroscopic polymer such as nylon, cellulose, polycarbonates or polyacrylates.

Preferably, the hygroscopic compound is a hygroscopic salt. Hygroscopic salts are well-known to the skilled person. According to one embodiment, the hygroscopic salt is selected from the group consisting of chlorates, sulphates, halides, nitrates, carboxylates, hydroxides, phosphates and mixtures and hydrates thereof, and more preferably selected from the group consisting of sulphates, chlorides, bromides, iodides, nitrates, citrates, acetates, hydroxides, phosphates and mixtures and hydrates thereof, even more preferably selected from the group consisting of magnesium chloride, calcium chloride, iron chloride, zinc chloride, aluminium chloride, magnesium bromide, calcium bromide, iron bromide, zinc bromide, aluminium bromide, magnesium iodide, calcium iodide, magnesium nitrate, calcium nitrate, iron nitrate, zinc nitrate, aluminium nitrate, magnesium acetate, calcium acetate, iron acetate, zinc acetate, aluminium acetate, and mixtures and hydrates thereof. For example, the hygroscopic compound may be selected from the group consisting of magnesium chloride, calcium chloride, aluminium chloride, zinc chlorides and mixtures and hydrates thereof.

According to one preferred embodiment, the hygroscopic salt is a hygroscopic chloride salt, preferably a hygroscopic alkali or alkaline earth chloride. Hygroscopic alkali or alkaline earth chloride are well-known to a person skilled in the art. The foregoing salts are particularly suitable for the present invention, due to their good moisture-capturing, -storing, and/or -releasing properties in combination with their usually non-toxicity, the easy accessibility, and low reactivity.

The hygroscopic chloride salt, preferably the hygroscopic alkali or alkaline earth chloride, may be present in any known form. Thus, according to one embodiment, the hygroscopic chloride salt is present in anhydrous form, i.e. in form of anhydrous chloride salt. In one embodiment, the chloride salt is present in at least partially hydrated form, i.e. in form of one of its hydrates. In one embodiment, the chloride salt, preferably the hygroscopic alkali or alkaline earth chloride, is present in dissolved form.

The most preferred hygroscopic compound according to the invention is calcium chloride. The calcium chloride may be present in any known form. Thus, according to one embodiment, the calcium chloride is present in anhydrous form, i.e. in form of anhydrous calcium chloride of the chemical formula $CaCl_2$). In one embodiment, the calcium chloride is present in at least partially hydrated form, i.e. in form of one of its hydrates such as calcium chloride monohydrate, calcium chloride dihydrate, calcium chloride tetrahydrate or calcium chloride hexahydrate, preferably calcium chloride dihydrate of the chemical formula $CaCl_2 \cdot 2H_2O$. In one embodiment, the calcium chloride is present in dissolved form. Preferably, the calcium chloride is present in at least partially hydrated form.

Further Components

In addition to the first and the second component, the inventive composition may further comprise other components. The skilled person will choose suitable additional components depending on the field of application.

According to one embodiment, the composition further comprises one or more coating and/or encapsulating agent(s). Coating agent and encapsulating agent are known in the art. In principal, any agents are suitable as coating and/or encapsulating agent, which may coat and/or encapsulate the first and/or second component of the inventive composition, and preferably the first component. Such agents are used to modify the chemical or physical properties of the to-be-coated and/or to-be-encapsulated component, for example, in order to improve interaction or binding to a different material. The coating and/or encapsulating agent may also modulate the uptake or release of a certain material such as water or moisture.

According to one embodiment, the coating agent and/or encapsulating agent is a linking agent, which promotes the binding of the inventive composition to organic material such as cellulose or cellulosic fibres.

According to one embodiment, the coating agent and/or encapsulating agent is a coupling agent. Coupling agents are known to the skilled person and include, for example, maleic anhydride-based, titanate-based or silane-based coupling agents.

According to one embodiment, the coating agent and/or encapsulating agent is a wax. Suitable waxes may be paraffin or synthetic waxes.

The Composition, the Composite Material and the Product

The composition according to the invention comprises a first component being an inorganic mineral or mineral-like material having a porous structure, and a second component being a hygroscopic compound.

In view of the foregoing, the skilled person will understand that the composition must comprise two components. The composition according to the present invention does not refer to a single material such as a hygroscopic inorganic mineral material having a porous structure.

It is further understood that the inventive composition is not limited to one inorganic mineral or mineral-like material. Thus, the inventive composition may comprise two or more inorganic mineral or mineral-like materials. For example, the composition comprises three inorganic minerals or mineral like materials. Preferably, the inventive composition comprises one organic mineral or mineral-like material.

The inventive composition is also not limited to one hygroscopic compound. Thus, the inventive composition may comprise two or more hygroscopic compounds. For example, the composition comprises three hygroscopic compounds. Preferably, the inventive composition comprises one hygroscopic compound.

It is appreciated that the composition according to the present invention is preferably free of silica- and/or silicate-containing materials, more preferably silica- and/or silicate-containing materials being in solid form. Additionally, the composition is preferably free of aluminate-containing materials, more preferably aluminate-containing materials being in solid form. In one embodiment, the composition is free of silicate- and aluminate-containing materials, more preferably silicate- and aluminate-containing materials being in solid form.

Thus, in a preferred embodiment, the composition according to the present invention comprises a first component being an inorganic mineral or mineral-like material having a porous structure, and a second component being a hygroscopic compound and is free of silica- and/or silicate-containing materials. In one embodiment, the composition according to the present invention comprises a first component being an inorganic mineral or mineral-like material having a porous structure, and a second component being a hygroscopic compound and is free of aluminate-containing materials.

For example, the composition according to the present invention comprises a first component being an inorganic mineral or mineral-like material having a porous structure, and a second component being a hygroscopic compound and is free of silica- and/or silicate-containing materials and of aluminate-containing materials. In one embodiment, the composition according to the present invention comprises a first component being an inorganic mineral or mineral-like material having a porous structure, and a second component being a hygroscopic compound and is free of silicate- and aluminate-containing materials.

Preferably, the composition according to the present invention is free of silica- and/or silicate-containing materials, and optionally of aluminate-containing materials, being in solid form. In one embodiment, the composition according to the present invention is free of silicate- and aluminate-containing materials being in solid form.

The composition according to the present invention is preferably free of silica- and/or silicate-containing materials selected from the group comprising synthetic silica, calcium silicate, silicates of monovalent salts such as potassium silicate, lithium silicate, sodium silicate, and mixtures thereof.

The composition according to the present invention is preferably free of aluminate-containing materials selected from the group comprising aluminium hydroxide, sodium aluminate, potassium aluminate, and mixtures thereof.

In one embodiment, the composition according to the present invention is preferably free of silicate- and aluminate-containing materials selected from aluminium silicate.

The composition according to the present invention may be present in liquid or solid form. According to one embodiment, the composition is present in liquid form, preferably in form of a suspension or slurry, preferably an aqueous suspension or an aqueous slurry.

If the composition is provided in form of an aqueous slurry or suspension, the aqueous slurry or suspension preferably comprises the composition in an amount from 1.0 to 80.0 wt.-%, based on the total weight of the aqueous slurry or suspension. More preferably, the aqueous slurry or suspension comprises the composition in an amount from 30.0 to 78.0 wt.-%, more preferably from 50.0 to 78.0 wt.-% and most preferably from 70.0 to 78.0 wt.-%, based on the total weight of the aqueous slurry or suspension.

An aqueous "slurry" or "suspension" in the meaning of the present invention comprises insoluble solids and water and optionally further additives such as dispersants, biocides and/or thickener and usually may contain large amounts of solids and, thus, can be more viscous and generally of higher density than the liquid from which it is formed.

According to a preferred embodiment, the composition is present in solid form.

For example, the composition may be a solid blend of the first and the second component. A "solid blend" in the meaning of the present invention refers to a composition comprising the first component in solid form and the second component in solid form, for example, in at least partially hydrated form or anhydrous form. In one embodiment, the composition is a solid blend, wherein the first component and the second component is present in at least partially hydrated form. For example, the second component may be present in the solid blend in fully hydrated form.

In another embodiment, the composition is a solid blend, wherein the first component is present in solid form and the second component is present in anhydrous form or partially hydrated form.

According to a preferred embodiment, the composition according to the invention is a solid blend of the first component and the second component, wherein the second component is a hygroscopic salt, preferably a hygroscopic chloride salt, more preferably a hygroscopic alkali or alkaline earth chloride, and most preferably calcium chloride. More preferably, the composition according to the invention is a solid blend of the first component and the second component, wherein the first component is a calcium carbonate-, magnesium carbonate-, calcium phosphate- and/or magnesium phosphate-containing material, preferably a calcium carbonate-containing and/or magnesium carbonate-containing material, more preferably a surface-reacted calcium carbonate or a hydromagnesite, more preferably a surface-reacted calcium carbonate, and wherein the second component is a hygroscopic salt, preferably a hygroscopic chloride salt, more preferably a hygroscopic alkali or alkaline earth chloride, and most preferably calcium chloride.

According to another preferred embodiment, the composition according to the invention is a solid blend of the first component and the second component, wherein the second component is a hygroscopic salt, preferably a hygroscopic chloride salt, more preferably a hygroscopic alkali or alkaline earth chloride, and most preferably calcium chloride, and wherein the second component is present in at least partially hydrated form. More preferably, the composition according to the invention is a solid blend of the first component and the second component, wherein the first component is a calcium carbonate-, magnesium carbonate-, calcium phosphate- and/or magnesium phosphate-containing material, preferably a calcium carbonate-containing and/or magnesium carbonate-containing material, more preferably a surface-reacted calcium carbonate or a hydromagnesite, still more preferably a surface-reacted calcium carbonate, and wherein the second component is a hygroscopic salt, preferably a hygroscopic chloride salt, more preferably a hygroscopic alkali or alkaline earth chloride, and most preferably calcium chloride, and wherein the second component is present in at least partially hydrated form.

According to another preferred embodiment, the first component of the composition is impregnated by the second component. "Impregnated" in the meaning of the present invention means that the second component is at least partially adsorbed onto the surface and/or absorbed into the pores of the first component. In other words, the first component may be at least partially coated with the second component.

According to one embodiment, the first component is impregnated by the second component, wherein the impregnated first component is obtained by mixing the first component with the second component in liquid form, preferably in form of an aqueous solution, and optionally drying the obtained composition.

Depending on the production process, the impregnated first component may comprise any one of the above-described forms of the second component or combinations thereof. Thus, according to one embodiment, the first component is impregnated with the second component, wherein the second component is present in anhydrous form, at least partially hydrated form and/or dissolved form.

For example, the first component may be impregnated with an aqueous solution of the second component followed by a subsequent drying step to produce a first component being impregnated with the second component in anhydrous form. Thus, according to one embodiment, the first component is impregnated with the second component, wherein the second component is present in anhydrous form.

The first component may also be impregnated, for example, with an aqueous solution of the second component followed by a subsequent drying step to produce a first component being impregnated with the second component in at least partially hydrated form. Thus, according to another embodiment, the first component is impregnated with the second component. According to another embodiment, the first component is impregnated with the second component, wherein the second component is present in at least partially hydrated form. According to yet another embodiment, the first component is impregnated with the second component, wherein the second component is present in dissolved form. According to yet another embodiment, the first component is impregnated with the second component, wherein the second component is present in at least partially hydrated form and in dissolved form.

According to a preferred embodiment, the first component is impregnated with the second component, wherein the second component is a hygroscopic salt, preferably a hygroscopic chloride salt, more preferably a hygroscopic alkali or alkaline earth chloride, and most preferably calcium chloride.

According to a preferred embodiment, the first component is impregnated with the second component, wherein the second component is a hygroscopic salt, preferably a hygroscopic chloride salt, more preferably a hygroscopic alkali or alkaline earth chloride, and most preferably calcium chloride, and wherein the second component is present in at least partially hydrated form and/or dissolved form.

More preferably, the first component is impregnated with the second component, wherein the first component is a calcium carbonate-, magnesium carbonate-, calcium phosphate- and/or magnesium phosphate-containing material, preferably a calcium carbonate-containing and/or magnesium carbonate-containing material, more preferably a surface-reacted calcium carbonate or a hydromagnesite, still more preferably a surface-reacted calcium carbonate, and wherein the second component is a hygroscopic salt, preferably a hygroscopic chloride salt, more preferably a hygroscopic alkali or alkaline earth chloride, and most preferably calcium chloride.

According to another preferred embodiment, the first component is impregnated with the second component, wherein the first component is a calcium carbonate-, magnesium carbonate-, calcium phosphate- and/or magnesium phosphate-containing material, preferably a calcium carbonate-containing and/or magnesium carbonate-containing material, more preferably a surface-reacted calcium carbonate or a hydromagnesite, still more preferably a surface-reacted calcium carbonate, and wherein the second component is a hygroscopic salt, preferably a hygroscopic chloride salt, more preferably a hygroscopic alkali or alkaline earth chloride, and most preferably calcium chloride, and wherein the second component is present in at least partially hydrated form and/or dissolved form.

For example, the first component is impregnated with the second component, wherein the first component is a surface-reacted calcium carbonate, and wherein the second component is a hygroscopic alkali or alkaline earth chloride, and most preferably calcium chloride, and wherein the second component is present in at least partially hydrated form and/or dissolved form. Alternatively, the first component is impregnated with the second component, wherein the first component is a hydromagnesite, and wherein the second component is a hygroscopic alkali or alkaline earth chloride, and most preferably calcium chloride, and wherein the second component is present in at least partially hydrated form and/or dissolved form.

According to one embodiment, the composition further comprises a coating and/or encapsulating agent.

For example, the coating and/or encapsulating agent may be used to coat and/or encapsulate the impregnated first component. Thus, according to one embodiment, the first component is impregnated with the second component, wherein the impregnated first component is further coated with a coating and/or encapsulating agent. According to a preferred embodiment, the first component is impregnated with the second component, wherein the second component is present in at least partially hydrated and/or dissolved form, and wherein the impregnated first component is further coated with a coating and/or encapsulating agent.

By coating and/or encapsulating the first component being impregnated with an at least partially hydrated and/or dissolved hydroscopic compound, the moisture-storing and/or -releasing of the inventive composition can be further improved. For example, it can be even better adjusted at which temperature the inventive composition will release the stored water and/or moisture. Furthermore, the coating and/or encapsulating agent may improve the binding of the inventive composition to another material, preferably an organic material such as organic fibre.

The above-described components may be present in the inventive composition in specific amounts. It is understood that for any amount of the hygroscopic compound defined herein, the amount is calculated based on the dry weight of the hygroscopic compound, i.e. the weight of the anhydrous hygroscopic compound.

According to one embodiment, the hygroscopic compound is present in an amount from 1.0 to 90 wt. %, preferably from 5.0 to 75 wt. %, more preferably from 7.5 to 60 wt. %, and most preferably from 10 to 40 wt. %, calculated from the dry weight of the hydroscopic compound and based on the total dry weight of the inorganic mineral or mineral-like material and the hygroscopic compound.

It has surprisingly been found by the inventors that the moisture-capturing, -storing, and/or releasing capacity of the inventive composition may be controlled in a simple and efficient way by choosing the amount of hygroscopic compound. Furthermore, the water-capturing, -storing, and/or releasing capacity of the inventive composition may also be adjusted by choosing a specific group of hygroscopic compounds such as the hygroscopic salts defined above. The moisture-capturing, -storing, and/or releasing capacity of the inventive composition may also be adjusted by choosing a specific form, in which the hygroscopic compound is present in the composition, for example, in at least partially hydrated form.

According to one embodiment, the inorganic mineral or mineral-like material is present in an amount from 10 to 99 wt. %, preferably from 25 to 95 wt. %, more preferably from 40 to 92.5 wt. %, and most preferably from 60 to 90 wt. %, based on the total dry weight of the inorganic mineral or mineral-like material and the hygroscopic compound.

According to one embodiment, the hygroscopic compound is present in an amount from 1.0 to 90 wt. %, preferably from 5.0 to 75 wt. %, more preferably from 7.5 to 60 wt. %, and most preferably from 10 to 40 wt. %, and the inorganic mineral or mineral-like material is present in an amount from 10 to 99 wt. %, preferably from 25 to 95 wt. %, more preferably from 40 to 92.5 wt. %, and most preferably from 60 to 90 wt. %, calculated from the dry weight of the hydroscopic compound and based on the total dry weight of the inorganic mineral or mineral-like material and the hygroscopic compound.

According to one embodiment, the composition comprises the inorganic mineral or mineral-like material being impregnated with the hygroscopic compound, wherein the first component is a calcium carbonate-, magnesium carbonate-, calcium phosphate- and/or magnesium phosphate-containing material, preferably a calcium carbonate-containing and/or magnesium carbonate-containing material, more preferably a surface-reacted calcium carbonate or a hydromagnesite, still more preferably a surface-reacted calcium carbonate, wherein the second component is a hygroscopic salt, preferably a hygroscopic chloride salt, more preferably a hygroscopic alkali or alkaline earth chloride, and most preferably calcium chloride, wherein the second component is present in at least partially hydrated form and/or dissolved form, and wherein the hygroscopic compound is present in an amount from 7.5 to 60 wt. %, preferably from 10 to 40 wt. %, and the inorganic mineral or mineral-like material is present in an amount from 40 to 92.5 wt. %, preferably from 60 to 90 wt. %, calculated from the dry weight of the hydroscopic compound and based on the total dry weight of the inorganic mineral or mineral-like material and the hygroscopic compound.

According to one embodiment, the composition comprises the inorganic mineral or mineral-like material being impregnated with the hygroscopic compound, wherein the first component is a surface-reacted calcium carbonate, wherein the second component is a hygroscopic alkali or alkaline earth chloride, preferably calcium chloride, wherein the second component is present in at least partially hydrated form and/or dissolved form, and wherein the hygroscopic compound is present in an amount from 7.5 to 60 wt. %, preferably from 10 to 40 wt. %, and the inorganic mineral or mineral-like material is present in an amount from 40 to 92.5 wt. %, preferably from 60 to 90 wt. %, calculated from the dry weight of the hydroscopic compound and based on the total dry weight of the inorganic mineral or mineral-like material and the hygroscopic compound.

According to one embodiment, the composition comprises the coating and/or encapsulating agent in an amount of 0.1 to 10 wt. %, preferably 1.0 to 7.5 wt. %, more preferably 2.0 to 5.0 wt. %, based on the total dry weight of the composition.

The composition according to the present invention may further be defined by its moisture pick-up susceptibility. Methods for determining the moisture pick-up susceptibility of a composition are well-known in the art. According to one embodiment, the composition in its anhydrous form or partially hydrated form has a moisture pick-up susceptibility from 0.01 to 4.00 g[H2O]/g[composition], preferably from 0.01 to 3.0 g[H2O]/g[composition], more preferably from 0.05 to 2.5 g[H2O]/g[composition], even more preferably from 0.10 to 1.5 g[H2O]/g[composition], and most preferably from 0.20 to 1.0 g[H2O]/g[composition] at equilibrium capacity and at a relative humidity of 50% and at a temperature of +23° C. (±2° C.).

The composition according to the invention may further be defined by its total moisture content. Methods for determining the total moisture content of a composition are also well-known in the art. According to one embodiment, the composition has a total moisture content in the range from 1.0 to 90 wt. %, preferably from 2.5 to 75 wt. %, more preferably from 5.0 to 60 wt. %, and most preferably from 10 to 50 wt. %, based on the total weight of the composition.

The "total moisture content" of the inventive composition refers to the percentage of moisture (i.e. water) which may be desorbed from a sample upon heating to 220° C. The total moisture contents as defined herein can be measured according to the Karl Fischer coulometric titration method, desorbing the moisture in an oven at 220° C. for 10 min and passing it continuously into a KF coulometer (Mettler Toledo coulometric KF Titrator C30, combined with Mettler oven DO 0337) using dry nitrogen at 100 ml/min for 10 min. A calibration curve using water has to be recorded and a blank of 10 min nitrogen flow without a sample has to be taken into account.

According to one embodiment, the composition comprises the inorganic mineral or mineral-like material being impregnated with the hygroscopic compound, wherein the first component is a calcium carbonate-, magnesium carbonate-, calcium phosphate- and/or magnesium phosphate-containing material, preferably a calcium carbonate-containing and/or magnesium carbonate-containing material, more preferably a surface-reacted calcium carbonate or a hydromagnesite, still more preferably a surface-reacted calcium carbonate, wherein the second component is a hygroscopic salt, preferably a hygroscopic chloride salt, more preferably a hygroscopic alkali or alkaline earth chloride, and most preferably calcium chloride, wherein the second component is present in at least partially hydrated form and/or dissolved form, and wherein the composition has a total moisture content in the range from 1.0 to 90 wt. %, preferably from 2.5 to 75 wt. %, more preferably from 5.0 to 60 wt. %, and most preferably from 10 to 50 wt. %, based on the total weight of the composition.

According to one embodiment, the composition comprises the inorganic mineral or mineral-like material being impregnated with the hygroscopic compound, wherein the first component is a hygroscopic alkali or alkaline earth chloride, and most preferably calcium chloride, wherein the second component is present in at least partially hydrated form and/or dissolved form, and wherein the composition has a total moisture content in the range from 10 to 50 wt. %, based on the total weight of the composition.

Another aspect of the present invention is the provision of a composite material comprising the inventive composition.

The composite material is not specifically limited to certain composite material. However, certain composite materials are preferred. According to one embodiment of the present invention, the composite material further comprises one or more materials selected from polymers, organic fibres, binders or resins.

According to one embodiment, the composite material further comprises one or more polymers. For example, the composite material may further comprise one or more polyamide, polypropylene, polyethylene, polyester, polyurethane and/or polyvinyl chloride component(s).

According to one embodiment, the composite material further comprises one or more resins, preferably thermosetting resins. For example, the composite material may further comprise one or more phenolic resins, epoxy resins, melamine-urea formaldehyde resins and/or polyester resins. According to another embodiment, the resin is selected from the group consisting of phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU) and mixtures thereof.

According to one embodiment, the composite material further comprises one or more organic fibres. In one embodiment, the organic fibre is cellulose-based fibre, preferably originating from softwood tree species, hardwood tree species, non-wood fibre plants and/or mixtures thereof.

According to a preferred embodiment, the composite material further comprises a resin or a combination of a resin and organic fibres, and more preferably comprises a combination of a resin and organic fibre. For example, the composite material may further comprises a thermosetting resin such as melamine-urea-formaldehyde resin (MUF) and organic fibre, preferably originating from a wood species.

The composite material may have any type of structure. In one embodiment, the composite material has a homogenous structure. A "homogenous structure" in the meaning of the present invention refers to a composite material, in which the inventive composition is evenly distributed. In another embodiment, the composite material has a layered structure. A "layered structure" in the meaning of the present invention refers to a composite material, in which the inventive composition is only or predominantly present in certain parts of structure such as in a surface layer or in a core layer.

According to another aspect of the present invention, a product comprising the inventive composition and/or the inventive composite material is provided.

The product may comprise the inventive composition and/or inventive composite material in any part of the product. Thus, according to one embodiment of the present invention, the composition and/or the composite material is present throughout the whole product or is only present in at least one part of the product.

The inventive composition and/or composite material is used to capture, store and/or release moisture. Thus, it may be advantageous to incorporate the composition and/or composite material in a surface or surface-near layer of the product, i.e. in an area of the product, which is in direct communication with the external surrounding or in close proximity thereof. According to a preferred embodiment, the composition and/or composite is present in a surface or surface-near layer of the product. A "surface layer" in the meaning of the present invention is a layer having a direct communication with the external surrounding. A "surface-near layer" is a layer being closer to the surface than to the core of the product.

The product may be any product which desirable has a certain water- or moisture-capturing, -storing and/or releasing activity. For example, such products may be food products, cosmetics and/or personal care products, pharmaceuticals, packaging materials or packaging inlays for food or other consumables, construction materials such as insulating materials, polymer-based or wood-based boards, automotive, marine or aviation application, electronic applications.

According to a preferred embodiment, the product is a wood-based board, a humectant or a desiccant.

According to a preferred embodiment, the product is a humectant. A "humectant" in the meaning of the invention is a substance used to retain a certain amount of moisture in a product or in the surrounding of a product. Due to an increased level of dryness, certain products may lose their quality earlier or may not exhibit certain characteristics or activities in the absence of humectants. Applications field of humectants are well-known to the skilled person. Humectants are, for example, used in food, cosmetics and/or personal care products, pharmaceuticals or packing materials.

According to a preferred embodiment, the product is a desiccant. A "desiccant" in the meaning of the present invention is a substance, which captures moisture from its surrounding in order to maintain a certain level of dryness. For example, desiccants are used in packaging materials or inlays for packaging materials.

According to a preferred embodiment of the invention, the product is a wood-based board. Wood-based boards are known to the skilled person. Preferably, the wood-based board is a fibre or particle board, and more preferably a particle board, high-density fibre (HDF) board, medium-density fibre (MDF) board, low-density fibre (LDF) board, an oriented strand board (OSB), a hardboard, or an insulation board.

It has surprisingly been found by the inventors that a wood-based board comprising the inventive composition has improved properties than a conventional board, if exposed to a heat and/or fire source. More precisely, the inventive wood-based board has a decreased heat release rate and/or shows less smoke development compared to conventional wood-based board, and, therefore, is a particularly safe construction material. Without wishing to be bound by theory, it is hypothesized that the moisture stored in the composition according to the invention is released upon exposure to heat and/or fire, which removes heat from the heat source. Furthermore, it has surprisingly been found that a wood-based board comprising the inventive composition has improved strength properties compared to a wood-based board only comprising the hygroscopic compound alone. It is hypothesized that the inventive composition prevents the uptake of stored water by the wood fibers, which allows for maintaining good strength properties of the board. In contrast thereto, when using a hygroscopic compound alone, the captured moisture may be absorbed by the fiber, which is disadvantageous.

The composition and/or composite according to the invention may be present in any part of the wood-based board. According to one embodiment, the wood-based board comprises the composition and/or the composite material throughout the whole wood-based board. For example, if the wood-based board is a multi-layered wood-based board then the composition and/or composite material is present in every layer of the board. According to another embodiment, the wood-based board comprises the composition and/or composite material in a core layer or a surface or surface-near layer, preferably in a surface or surface-near layer.

Production methods for wood-based boards are well-known to the skilled person. Production methods for wood-based boards are, for example, described in detail in EP 2 944 621 A1 or EP 3 189 952 A1.

The wood-based board may comprise the inventive composition and/or composite material in a wide range of amounts.

According to one embodiment, the wood-based board comprises the composition and/or composite material according to the invention in an amount from 2.5 to 40.0 wt. %, preferably from 5.0 to 35 wt. %, more preferably from 10.0 to 30.0 wt. %, and most preferably from 15 to 25 wt. %, based on the total dry weight of the composition and/or composite material and the wood fibres and/or particles.

According to another embodiment, the wood-based board comprises a base layer and a surface layer on the first and/reverse side of the wood-based board, wherein the composition and/or composite material according to the invention is present in the surface layer on the first and/ reverse side of the wood-based board in an amount from 2.5 to 40.0 wt. %, preferably from 5.0 to 35 wt. %, more preferably from 10.0 to 30.0 wt. %, and most preferably from 15 to 25 wt. %, based on the total dry weight of the composition and/or composite material and the wood fibres and/or particles.

2. The Process According to the Invention

In another aspect of the present invention, a process is provided for preparing the composition according to the invention, the process comprising the steps of:
a) providing a first component being an inorganic mineral or mineral-like material having a porous structure,
b) providing a second component being a hygroscopic compound
c) mixing the first component of step a) with the second component of step b),
d) optionally drying the mixture obtained in step c).

According to one embodiment, the first component provided in step a) is a calcium carbonate-, magnesium carbonate-, calcium phosphate- and/or magnesium phosphate-containing material, and preferably a calcium carbonate- and/or magnesium carbonate-containing material, more preferably is a surface-reacted calcium carbonate or a hydromagnesite, and most preferably is a surface-reacted calcium carbonate.

According to one embodiment, the first component provided in step a) has a median particle size d50 from 1.0 μm to 100 μm, more preferably from 2.0 μm to 80 μm and most preferably from 3.0 μm to 40 μm and/or a specific surface area of from 20 to 200 m2/g, more preferably from 25 to 180 m2/g and most preferably from 30 to 100 m2/g as measured by the BET nitrogen method.

According to one embodiment, the first component provided in step a) has an intra-particle intruded specific pore volume in the range from 0.1 to 2.3 cm3/g, more preferably from 0.4 to 1.8 cm3/g, and most preferably from 0.6 to 1.6 cm3/g, calculated from mercury porosimetry measurement.

According to one embodiment, the first component is provided in step a) in form of an aqueous suspension, or in solid form.

According to one embodiment, the first component is provided in form of an aqueous suspension. Preferably, the aqueous suspension comprises the first component in an amount from 1.0 to 80.0 wt.-%, based on the total weight of the aqueous suspension. More preferably, the aqueous slurry or suspension comprises the first component in an amount from 30.0 to 78.0 wt.-%, more preferably from 50.0 to 78.0 wt.-% and most preferably from 70.0 to 78.0 wt.-%, based on the total weight of the aqueous suspension.

Preferably, the first component is provided in step a) in solid form.

According to one embodiment, the second component provided in step b) is chosen from the group consisting of salts, polyalkylene glycols, polyols, silicon-containing compounds, urea, alpha-hydroxy acids, or polymers, more preferably is a hygroscopic salt, and most preferably is calcium chloride. According to a preferred embodiment, the second component provided in step b) is a hygroscopic chloride salt, more preferably a hygroscopic alkali or alkaline earth chloride salt, and most preferably is calcium chloride.

According to one embodiment, the second component provided in step b) in its anhydrous or partially hydrated form has a moisture pick-up susceptibility from 0.01 to 4.00 g[H2O]/g[compound], preferably from 0.01 to 3.0 g[H2O]/ g[compound], more preferably from 0.25 to 2.5 g[H2O]/g [compound], even more preferably from 0.50 to 2.5 g[H2O]/ g[compound], and most preferably from 1.0 to 2.0 g[H2O]/ g[compound] at equilibrium capacity and at a relative humidity of 50% and at a temperature of +23° C. (±2° C.).

According to one embodiment, the second component is provided in step b) in at least partially hydrated form or anhydrous form. According to one preferred embodiment, the second component is provided in step b) in anhydrous form or partially hydrated form.

If the first component of step a) and the second component of step b) are provided in solid form, i.e. in anhydrous form, partially hydrated form or fully hydrated form, then the mixing step c) refers to a solid blending step. Thus, according to one embodiment of the present invention, step c) refers to one or more solid blending step(s). It is understood by the skilled person that a solid blending step requires the first component and the second component to be provided in solid form.

According to one embodiment of the invention, the process for preparing the composition according to the invention comprises the steps of:
a) providing a first component being an inorganic mineral or mineral-like material having a porous structure, wherein the first component is provided in solid form,
b) providing a second component being a hygroscopic compound, wherein the second component is provided in solid form, preferably in anhydrous form or partially hydrated form,
c) mixing the first component of step a) with the second component of step b), wherein step c) is a solid blending step, and
d) optionally drying the mixture obtained in step c).

According to one embodiment, the process according to the invention comprises a step d) of drying the mixture obtained in step c). The drying can be carried out by any method known in the art, and the skilled person will adapt the drying conditions such as the temperature according to his process equipment. For example, the drying step d) may be a spray drying step.

According to one embodiment, drying step d) is carried out in a temperature range from 80 to 150° C., preferably from 100 to 140° C., and preferably until a constant weight of the dried material is reached. For example, the drying step d) is carried out at 130° C.

It is understood that, if step c) refers to more than one solid blending step, then the second or further solid blending step may comprise the step of adding another amount of the same first and/or second component and/or an amount of a different first and/or second component. For example, the step c) may comprise two solid blending steps, wherein the first component is blended with a first second component and then with a second second component.

According to one embodiment, the process further comprises a step b2) of providing another amount of the same or a different second component, and a step c2) of solid blending the second component provided in step b2) with the composition obtained in step c) or step d).

Step c) may also refer to an impregnating step. An "impregnating step" in the meaning of the present invention refers to a mixing step, wherein the first and the second component are either mixed in the presence of a solvent, preferably water, or wherein the second component is a liquid. If necessary, the solvent mediates the ad- and/or absorption of the second component onto the surface and/or into the pores of the first component. According to a preferred embodiment, step c) refers to one or more impregnating step(s).

If the hygroscopic compound as such is a solid, the impregnating step may require the presence of a solvent, preferably water, to be carried out successfully. Thus, the first and/or the second component is provided in step a) and/or step b) in liquid form. According to one embodiment, step c) is one or more impregnating step(s), wherein the first component is provided in step a) in liquid form, preferably in form of an aqueous suspension. According to another embodiment, step c) is one or more impregnating step(s), wherein the second component is provided in liquid form, preferably in form of an aqueous solution. According to a preferred embodiment, step c) is one or more impregnating step(s), wherein the first component is provided in step a) in solid form, and wherein the second component is provided in step b) in form of an aqueous solution.

According to a preferred embodiment of the invention, the process for preparing the composition according to the invention comprises the steps of:
  a) providing a first component being an inorganic mineral or mineral-like material having a porous structure, wherein the first component is provided in solid form,
  b) providing a second component being a hygroscopic compound, wherein the second component is provided in form of an aqueous solution,
  c) mixing the first component of step a) with the second component of step b), wherein step c) is an impregnating step.

According to another preferred embodiment of the invention, the process for preparing the composition according to the invention comprises the steps of:
  a) providing a first component being an inorganic mineral or mineral-like material having a porous structure, wherein the first component is provided in solid form,
  b) providing a second component being a hygroscopic compound, wherein the second component is provided in form of an aqueous solution,
  c) mixing the first component of step a) with the second component of step b), wherein step c) is an impregnating step, and
  d) drying the mixture obtained in step c).

Step c) may comprise more than one impregnating step. If step c) comprises two or more impregnating steps then the second or further impregnating may comprise the step of adding another amount of the same first and/or second component and/or an amount of a different first and/or second component. For example, step c) may comprise two impregnating steps, wherein the first component is impregnated with a first second component and then with the same or a different second second component. Step c) may also comprise two impregnating steps, wherein the first component is impregnated with a first second component and then with a second second component.

Thus, according to one embodiment, the process further comprises a step b2) of providing a different second component, and a step c2) of impregnating the composition obtained in step c) with the second component provided in step b2).

It is also possible that the impregnating step is repeated with the same second component. Thus, according to one embodiment, step c) comprises two impregnating steps, wherein the first component is impregnated with a first amount of the second component and then with a second amount of the second component.

According to one embodiment, the process further comprises a step b2) of providing another amount of the second component, and a step c2) of impregnating the composition obtained in step c) with the second component provided in step b2).

According to a one embodiment of the invention, the process for preparing the composition according to the invention comprises the steps of:
  a) providing a first component being an inorganic mineral or mineral-like material having a porous structure, wherein the first component is provided in solid form,
  b) providing a second component being a hygroscopic compound, wherein the second component is provided in form of an aqueous solution,
  b2) providing another amount of the same second component, wherein the second component is provided in form of an aqueous solution,
  c) mixing the first component of step a) with the second component of step b), wherein step c) is an impregnating step, and
  c2) mixing the composition obtained in step c) with the second component of step b2), wherein step c2) is a second impregnating step.

Additionally or alternatively, the second or further impregnation step may be carried out after drying step d). For example, the composition obtained in step d) may be impregnated with the same and/or a different second component as in step c). According to one embodiment, the process further comprises a step b2) of providing another amount of the same or a different second component, and a step c2) of impregnating the composition obtained in step d) with the second component provided in step b2).

Step c) is not limited to specific mixing conditions, and, therefore, step c) can be carried out by any mixing conditions and/or with any mixing equipment known in the art. The skilled man will adapt these mixing conditions (such as the configuration of mixing pallets and mixing speed) according to his process equipment.

In general, it is to be understood that the moisture content of the composition may be adjusted by adjusting the moisture content of the first and/or the second composition provided in step a) and/or b), by the drying step d), and/or by allowing the composition obtained in step c) or d) to contact moisture in a step e). The specific way of adjusting the moisture content may be chosen depending on the desired type of composition and/or the available process equipment.

Thus, it is possible to adjust the total moisture content of the inventive composition by adjusting the moisture content of the first and/or the second composition provided in step a) and/or b), and preferably by adjusting the moisture content of the second component provided in step b).

For example, the second component may be provided in form of an aqueous solution. If a composition is desired with a high total moisture content in this case, then a drying step d) with the composition obtained in step c) may not be necessary. On the other hand, if a composition is desired with a low or lower total moisture content, then the composition obtained in step c) may be submitted to drying step d). In another example, the second component may be provided in anhydrous form. If a composition is desired with a low total moisture content in this case, then a drying step d) with the composition obtained in step c) may not be necessary.

Furthermore, the desired final moisture content of the composition according to the invention may be adjusted in drying step d).

According to one embodiment, the composition obtained in step d) has a total moisture content of less than or equal to 1.0 wt.-%, preferably less than or equal to 0.5 wt.-%, more preferably less than or equal to 0.2 wt.-%, based on the total weight of the composition.

According to another embodiment, the composition obtained in step d) has a total moisture content in the range from 1.0 to 90 wt. %, preferably from 2.5 to 75 wt. %, more preferably from 5.0 to 60 wt. %, and most preferably from 10 to 50 wt. %, based on the total weight of the composition.

It is further possible to adjust the final total moisture content of the inventive composition by allowing the composition obtained in step c) or d) to ab- and/or adsorb moisture from its surrounding in a process step e). Step e) may be carried out by allowing the composition obtained in step c) or d) ab- and/or adsorb moisture from its surrounding air until a constant weight of the composition is reached. Process step e) may preferably be carried out in case the inventive composition is used as a water-storing and/or -releasing composition.

Thus, according to one embodiment, the process comprises the steps of:
  a) providing a first component being an inorganic mineral or mineral-like material having a porous structure,
  b) providing a second component being a hygroscopic compound
  c) mixing the first component of step a) with the second component of step b),
  e) allowing the composition obtained in step c) to ab- and/or adsorb moisture.

According to one preferred embodiment, the process comprising the steps of:
  a) providing a first component being an inorganic mineral or mineral-like material having a porous structure,
  b) providing a second component being a hygroscopic compound
  c) mixing the first component of step a) with the second component of step b),
  d) drying the mixture obtained in step c),
  e) allowing the composition obtained in step d) to ab- and/or adsorb moisture.

According to one preferred embodiment, the process comprising the steps of:
  a) providing a first component being an inorganic mineral or mineral-like material having a porous structure,
  b) providing a second component being a hygroscopic compound
  c) mixing the first component of step a) with the second component of step b),
  d) drying the mixture obtained in step c),
  e) allowing the composition obtained in step d) to ab- and/or adsorb moisture until a constant weight of the composition is reached.

According to one preferred embodiment, the process comprising the steps of:
  a) providing a first component being an inorganic mineral or mineral-like material having a porous structure, wherein the first component is provided in solid form,
  b) providing a second component being a hygroscopic compound, wherein the second component is provided in form of an aqueous solution,
  c) mixing the first component of step a) with the second component of step b), wherein step c) is an impregnating step,
  d) drying the mixture obtained in step c),
  e) allowing the composition obtained in step d) to ab- and/or adsorb moisture.

The composition obtained in step c), d) or e) may be further processed in additional process steps. For example, the composition obtained in step c), d) or e) may be coated and/or encapsulated with a coating and/or encapsulating agent.

In one embodiment, the process further comprises the steps of:
  f) providing a coating and/or encapsulating agent
  g) mixing the coating and/or encapsulating agent of step f) with the mixture obtained in step c), d) or e).

According to a one embodiment of the invention, the process for preparing the composition according to the invention comprises the steps of:
  a) providing a first component being an inorganic mineral or mineral-like material having a porous structure, wherein the first component is provided in solid form,
  b) providing a second component being a hygroscopic compound, wherein the second component is provided in form of an aqueous solution,
  c) mixing the first component of step a) with the second component of step b), wherein step c) is an impregnating step, and
  f) providing a coating and/or encapsulating agent
  g) mixing the coating and/or encapsulating agent of step f) with the mixture obtained in step c).

According to one embodiment of the invention, the process for preparing the composition according to the invention comprises the steps of:
  a) providing a first component being an inorganic mineral or mineral-like material having a porous structure, wherein the first component is provided in solid form,
  b) providing a second component being a hygroscopic compound, wherein the second component is provided in form of an aqueous solution,
  c) mixing the first component of step a) with the second component of step b), wherein step c) is an impregnating step, and
  d) drying the mixture obtained in step c),
  f) providing a coating and/or encapsulating agent
  g) mixing the coating and/or encapsulating agent of step f) with the mixture obtained in step d).

According to a one embodiment of the invention, the process for preparing the composition according to the invention comprises the steps of:
a) providing a first component being an inorganic mineral or mineral-like material having a porous structure, wherein the first component is provided in solid form,
b) providing a second component being a hygroscopic compound, wherein the second component is provided in form of an aqueous solution,
c) mixing the first component of step a) with the second component of step b), wherein step c) is an impregnating step, and
d) drying the mixture obtained in step c),
e) allowing the composition obtained in step d) to ab- and/or adsorb moisture,
f) providing a coating and/or encapsulating agent
g) mixing the coating and/or encapsulating agent of step e) with the mixture obtained in step e).

3. The Use According to the Invention

In another aspect of the present invention, a use of the inventive composition and/or composite material is provided as a flame retardant or as a humidity adjusting agent.

It has surprisingly been found by the inventors that the composition and/or the composite material as defined in the present invention may be used is a flame retardant or as a humidity adjustment agent. For example, the inventors surprisingly found that a product such as a wood-based board comprising the inventive composition shows improved heat and/or fire resistance.

According to one embodiment, the composition and/or composite material is used as a flame retardant, wherein the flame retardant is part of a flame resistant product preferably a flame resistant wood-based board, more preferably a flame resistant fibre or particle board, and most preferably a particle board, a high-density fibre (HDF) board, medium-density fibre (MDF) board, low-density fibre (LDF) board, oriented strand board (OSB), hardboard, or an insulation board.

FIGURES

FIG. 1: Moisture-capturing and -storing of the inventive composition 1 at 50% relative humidity (50%) and 90% relative humidity (90%) at 25° C. over a period of 100 min compared with a surface-reacted calcium carbonate SRCC1 not being impregnated with a hygroscopic compound (50% and 90%). The "moisture uptake" refers to the amount in gram of captured moisture/water per gram of composition.

Figure 2:
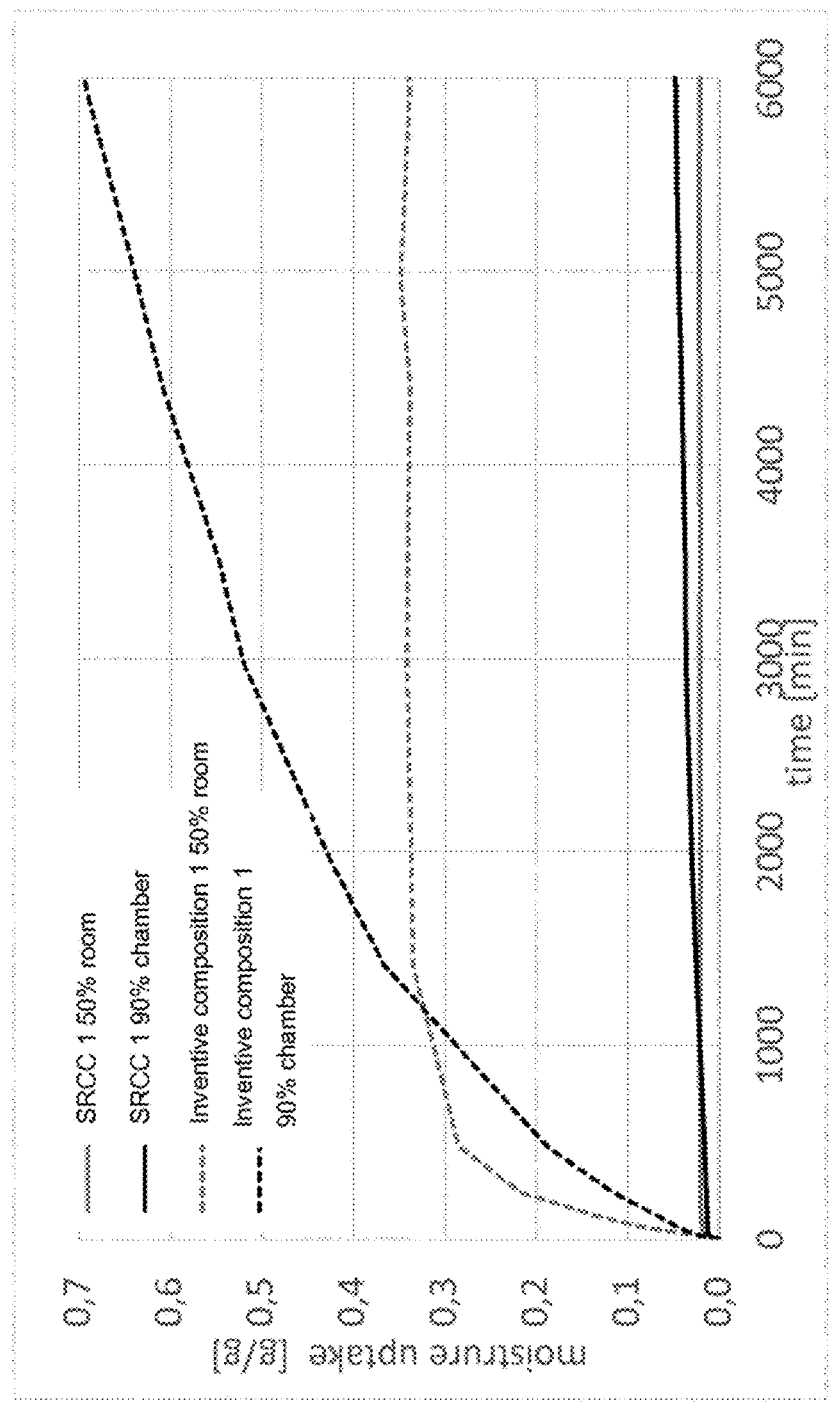

FIG. 2: Moisture-capturing and -storing of the inventive composition 1 at 50% relative humidity (50%) and 90% relative humidity (90%) at 25° C. over a period of three days compared with a surface-reacted calcium carbonate SRCC1 not impregnated with a hygroscopic compound (50% and 90%). The "moisture uptake" refers to the amount in gram of captured moisture/water per gram of composition.

Figure 3:
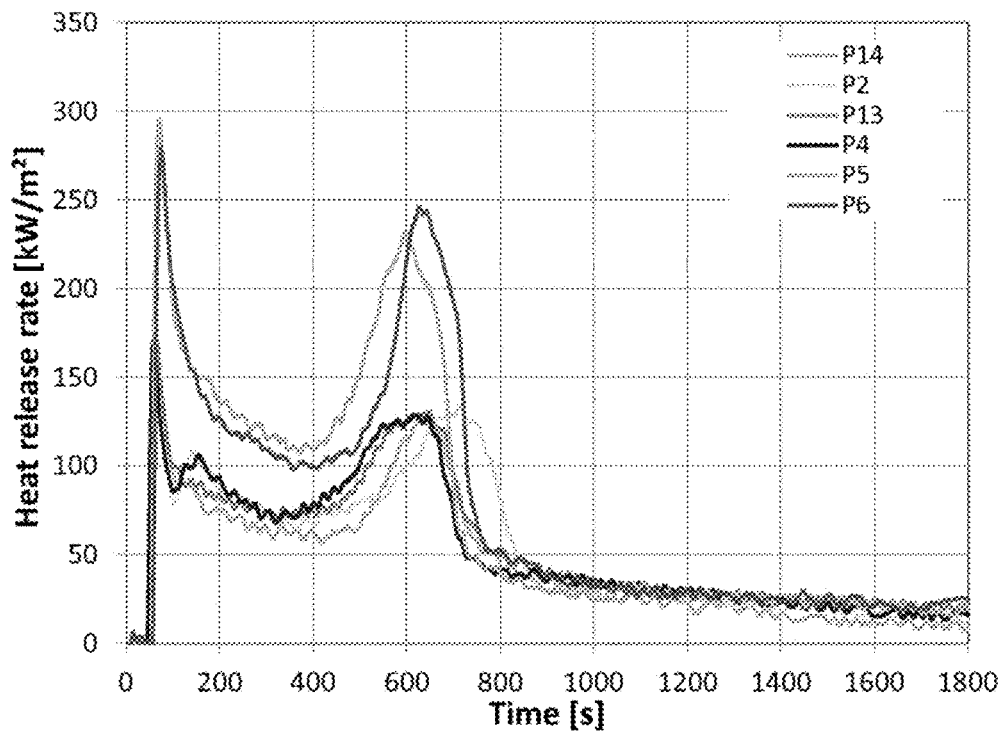

FIG. 3: Heat release rate of the inventive product (particle board P13 and P14 comprising the inventive composition 1 as flame retardant) and comparative products over time in a fire resistance test according to ISO 5660-1, Prüfung zum Brandverhalten.

Figure 4:
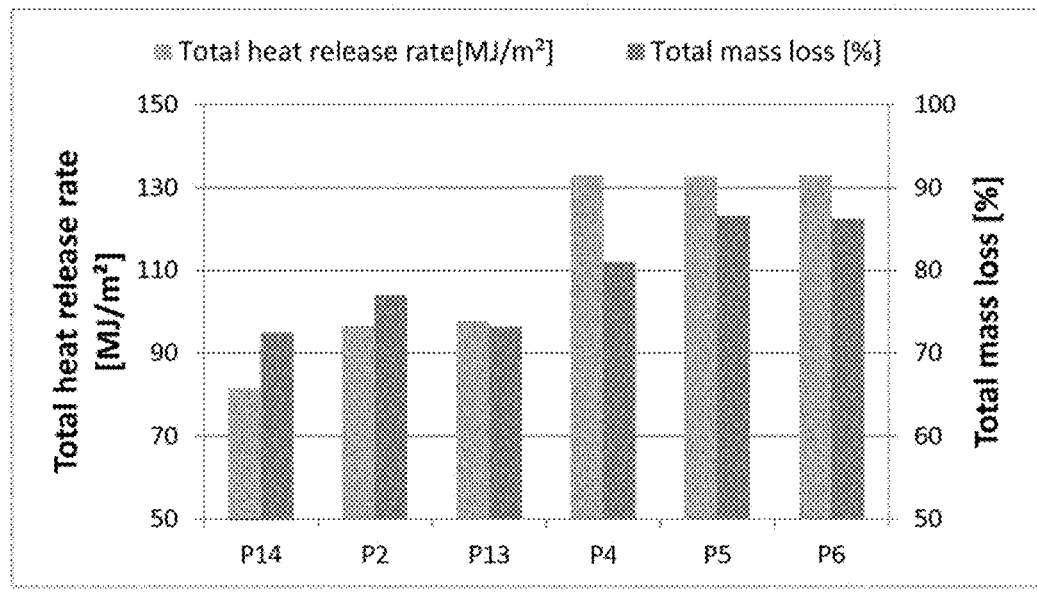

FIG. 4: Total heat release rate and total mass loss of the inventive product (particle board P13 and P14 comprising the inventive composition 1 as flame retardant) and comparative products over time in a fire resistance test according to ISO 5660-1, Prüfung zum Brandverhalten.

Figure 5:
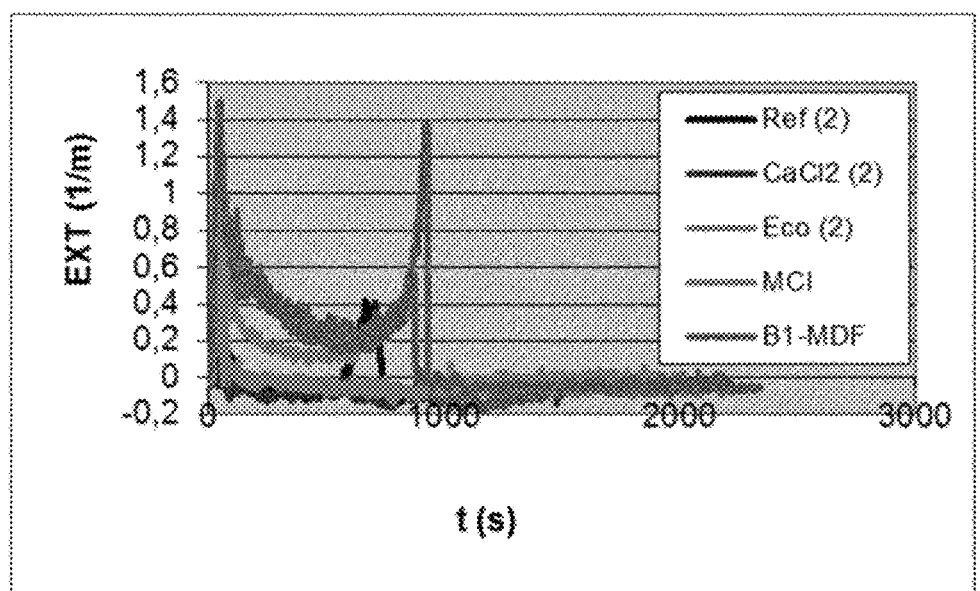

FIG. 5: Extinction coefficient measured for the inventive product (MCI; MDF comprising the inventive composition 1 as flame retardant) and comparative products over time in a fire resistance test according to ISO 5660-1, Prüfung zum Brandverhalten.

Figure 6:
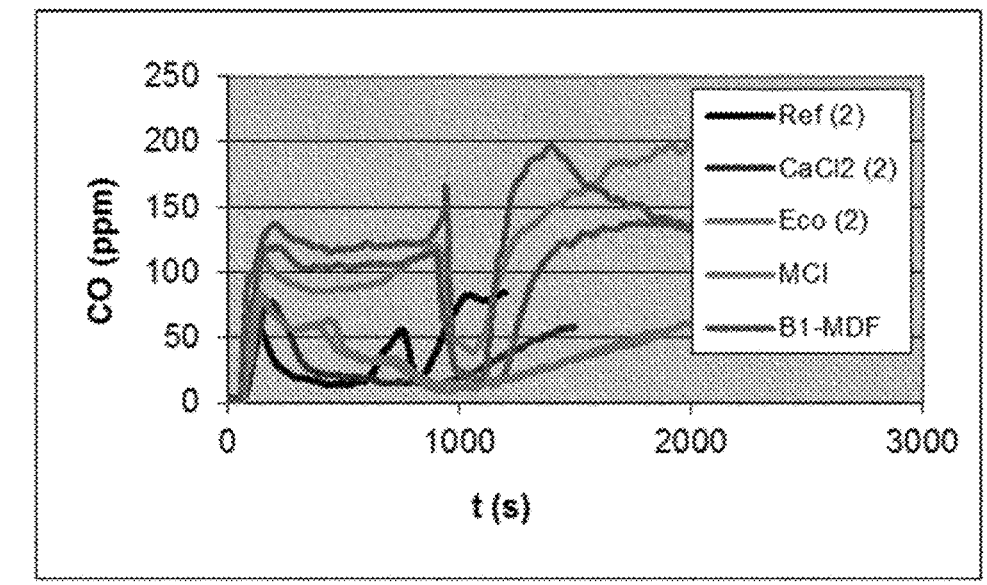

FIG. 6: Carbon monoxide (smoke) development measured for the inventive product (MCI; MDF comprising the inventive composition 1 as flame retardant) and comparative products over time in a fire resistance test according to ISO 5660-1, Prüfung zum Brandverhalten.

Figure 7:
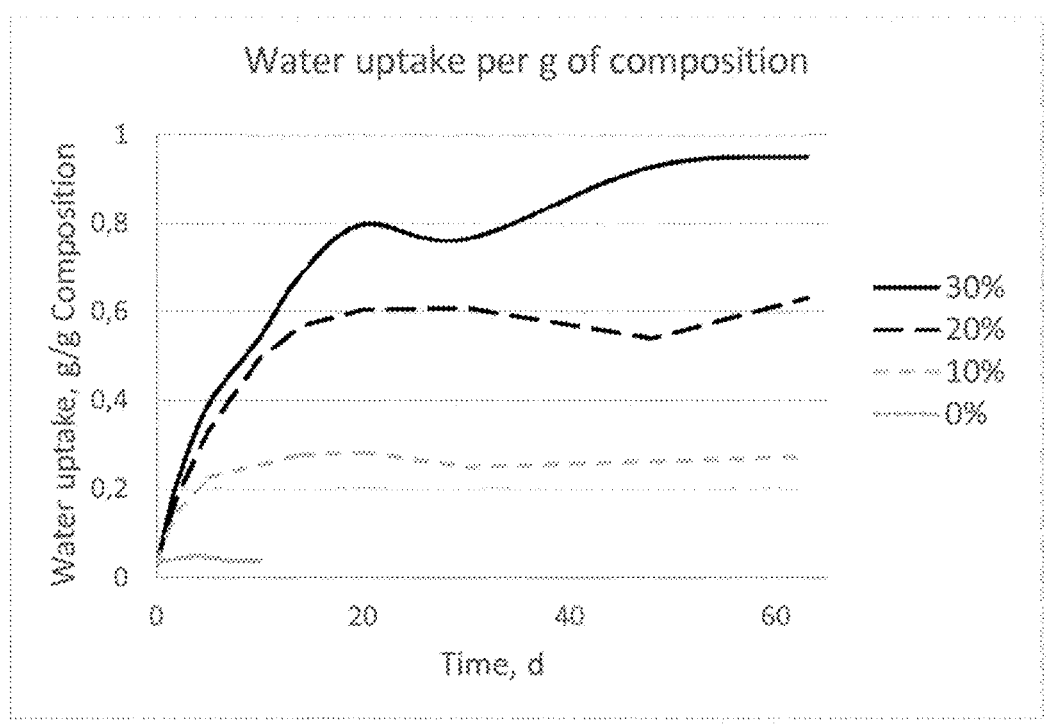

FIG. 7: Water-capturing and water-storing potential of inventive compositions 2a (10%), 2b (20%) and 2c (30%) in comparison with surface-reacted calcium carbonate SRCC2 not being dry blended with calcium chloride. The "moisture uptake" refers to the amount in gram of captured moisture/water per gram of composition.

EXAMPLES

1. Preparation of the Inventive Composition
1.1 Materials
A) First Component: Surface-Reacted Calcium Carbonate (SRCC)
a) SRCC1 has a $d_{50}$=4.44 µm, a $d_{98}$=11.0 µm, a SSA=54.7 $m^2g^{-1}$ and an intra-particle intruded specific pore volume of 0.807 $cm^3/g$ (for the pore diameter range of 0.004 to 0.47 µm).

SRCC1 was prepared according to the following procedure: SRCC1 was obtained by preparing 350 litres of an aqueous suspension of ground calcium carbonate in a mixing vessel by adjusting the solids content of a ground limestone calcium carbonate from Omya SAS, Orgon having a weight-based median particle size of 1.3 µm, as determined by sedimentation, such that a solids content of 10 wt %, based on the total weight of the aqueous suspension, is obtained.

Whilst mixing the slurry at a speed of 6.2 m/s, 11.2 kg phosphoric acid was added in form of an aqueous solution containing 30 wt % phosphoric acid to said suspension over a period of 20 minutes at a temperature of 70° C. After the addition of the acid, the slurry was stirred for additional 5 minutes, before removing it from the vessel and drying using a jet-dryer.

b) SRCC2 has a $d_{50}$=6.6 mm, $d_{98}$=13.7 mm, SSA=59.9 $m^2g^{-1}$ with an intra-particle intruded specific pore volume is 0.939 $cm^3/g$ (for the pore diameter range of 0.004 to 0.51 µm). SRCC2 was obtained by preparing 350 litres of an aqueous suspension of ground calcium carbonate in a mixing vessel by adjusting the solids content of a ground limestone calcium carbonate from Omya SAS, Orgon having a mass based median particle size of 1.3 µm, as determined by sedimentation, such that a solids content of 10 wt.-%, based on the total weight of the aqueous suspension, is obtained.

Whilst mixing the slurry at a speed of 6.2 m/s, 11.2 kg phosphoric acid was added in form of an aqueous solution containing 30 wt.-% phosphoric acid to said suspension over a period of 20 minutes at a temperature of 70° C. After the addition of the acid, the slurry was stirred for additional 5 minutes, before removing it from the vessel and drying using a jet-dryer.

B) Second component: Calcium chloride
a) Calcium chloride 1: 42% calcium chloride in aqueous solution
b) Calcium chloride 2: Pelletized CaCl2) (anhydrous, granular, mm, ≥93%.

Sigma-Aldrich, Switzerland) was ground to particles 0.2 mm using a high speed rotor mill (Ultra Centrifugal Mill ZM 200, Retsch GmbH, Haan, Germany).

1.2 Preparation Process of the Inventive Composition

A) Inventive composition 1:

The inventive composition 1 was obtained by performing the following steps:
- a) Providing surface-reacted calcium carbonate SRCC1 in solid form
- b) Providing calcium chloride in form of an 42% calcium chloride aqueous solution (Calcium chloride 1)
- c) Impregnating the surface-reacted calcium carbonate of step a) with the aqueous calcium chloride solution of step b) by placing 623 g of the surface-reacted calcium carbonate (TP2760/2) in a Lödige Mixer and adding 335 g of 42 wt. % $CaCl_2$) aqueous solution using a funnel, while steering the surface-reacted calcium carbonate with a constant speed of 400-900 rpm. 958 g of the inventive composition with a final content of 18 wt. % $CaCl_2$) on surface-reacted calcium carbonate (dry/dry) was obtained.
- d) Drying the product obtained in step c) in a drying chamber overnight at 130° C.

B) Inventive Composition 2:

The inventive composition 2 was obtained by performing the following steps:
- a) Providing surface-reacted calcium carbonate SRCC2 in solid form,
- b) Providing calcium chloride in anhydrous form (Calcium chloride 2),
- c) SRCC2 was weighed into a 0.5 l bottle (PE-LD, Semadeni, Germany) and the calcium chloride 2 was added to obtain the indicated loading of calcium chloride for inventive composition 2a to 2c. The bottle was immediately closed and the components were dry blended by mixing in a Turbula® Shaker Mixer (Glen Mills Inc, Clifton NJ, USA) for 2 min. Approximately 100 ml was transferred into a 600 ml beaker (150 mm diameter) and covered with filter paper for testing (see section 1.3.B, Test 2). The remaining powder mixture was closed and the PE bottle sealed with parafilm.

Three different inventive compositions were prepared according to the process above:
Inventive composition 2a: 10 wt. % of calcium chloride
Inventive composition 2b: 20 wt. % of calcium chloride
Inventive composition 2c: 30 wt. % of calcium chloride Dry Mass Dry mass was determined using a Halogen Moisture Analyzer (HB43-S, Mettler Toledo, Switzerland) drying at 200° C.

1.3 Moisture-Capturing and -Storing Capability of the Inventive Compositions

A) Test 1

Moisture-capturing tests were performed to determine the moisture-capturing and -storing potential for the surface-reacted calcium carbonate as described in 1.1. A) a), i.e. the SRCC1 alone, and for the inventive composition 1 as obtained by the process described in 1.2. A).

Samples of both batches were placed in Petri dishes and dried over night at 105° C. The samples were kept under 2 different humidity conditions:

50% relative humidity in a climate controlled laboratory at 25° C.

90% relative humidity in a desiccator in the laboratory at 25° C.

The sample weight was recorded overtime. After three days the samples were dried over night at 105° C. and the experiment was repeated.

The results for moisture capturing and storing are shown in FIG. 1 for a timescale of 100 minutes and in FIG. 2 for a timescale of 3 days.

FIG. 1 shows that during the first 100 minutes the samples in 50% relative humidity (rH) absorb more moisture than the samples kept in 90% rH. The samples under 50% rH were kept in the open laboratory with laboratory air currents rather than the limited space desiccator where the atmosphere needs to keep replenishing by diffusion of moisture as the sample takes up the moisture in this static local atmosphere. FIG. 2 shows how, over the period of 3 days, the comparative surface-reacted calcium carbonate SRCC1 has only taken up a small amount of moisture when kept at 50% rH. The moisture capturing is slightly more pronounced when the comparative sample is kept at 90%. In comparison thereto, the inventive composition 1 has captured and stored a significant higher amount of water during the first 100 minutes as well as over the period of 3 days. When kept at 50% rH, the inventive composition 1 has reached an equilibrium at 0.35 g(water)/g(composition). This means that for 1 g of inventive composition 1 (of which 18 wt. % is CaCl2)) 0.35 g of moisture has been taken up into the composition. At this state, the inventive composition 1 is still a free flowing powder, which is easy to handle.

B) Test 2

The covered beakers containing inventive composition 2a to 2c were kept in a climate chamber (KBF LQC 240, Binder, Germany) in the dark at 25° C. with 60% relative humidity.

FIG. 7 shows the water-capturing and water-storing of inventive compositions 2a (10%), 2b (20%) and 2c (30%) in comparison with surface-reacted calcium carbonate SRCC2 not being dry blended with calcium chloride.

2. Use of the Inventive Composition as a Flame Retardant—Manufacturing of Composites Comprising the Inventive Composition and Evaluation of Fire Resistance 2.1 Example 1

2.1.1 Manufacturing of a Particle Board Comprising the Inventive Composition as Flame Retardant Different types of particle boards with partial substitution of wood particles by flame retardant were manufactured in lab scale (Table 1.). Surface layer (fine) and core layer (gross) wood chips were used for production of three layered particleboard. The MUF adhesive was provided by BASF AG under the name Kauramin Leim 620 flüssig. The amount of adhesive applied in each board and other manufacturing parameters are given is in Table 1.

TABLE 1

Particle board variants manufactured according to parameters given in Table 2 and by applying flame retardants as defined in Table 3.

| Label | Pressing factor (sec/mm) | Core layer (CL) glue (%) | Surface layer (SL) glue (%) | Glue type | Flame retardant * | Wood substitution |
|---|---|---|---|---|---|---|
| Panel 1 | 15 | 15 | 15 | MUF | EcoChem | 10% SL, 0% CL |
| Panel 2 | 15 | 15 | 15 | MUF | EcoChem | 10% SL, 0% CL |
| Panel 3 | 15 | 15 | 15 | MUF | EcoChem | 10% SL, 10% CL |
| Panel 4 | 15 | 15 | 15 | MUF | EcoChem | 10% SL, 10% CL |
| Panel 5 | 15 | 15 | 15 | MUF | — | — |
| Panel 6 | 15 | 15 | 15 | MUF | — | — |
| Panel 7 | 15 | 30 | 30 | MUF | MSC 15.06704 | 20% |
| Panel 8 | 15 | 30 | 30 | MUF | MSC 15.06704 | 20% |
| Panel 9 | 15 | 25 | 25 | MUF | MSC 15.06704 | 20% |
| Panel 10 | 15 | 25 | 25 | MUF | MSC 15.06704 | 20% |
| Panel 11 | 15 | 20 | 20 | MUF | MSC 15.06704 | 20% |
| Panel 12 | 15 | 20 | 20 | MUF | MSC 15.06704 | 20% |
| Panel 13 | 15 | 15 | 15 | MUF | MSC 15.06704 | 20% |
| Panel 14 | 15 | 15 | 15 | MUF | MSC 15.06704 | 20% |

* as defined in Table 3

TABLE 2

Lab scale manufacturing parameters for particle boards

| | |
|---|---|
| Plate dimensions | 400 × 400 × 15.2 mm |
| Ratio of SL/CL/SL | 25/50/25 (mass-based) |
| Target density | 650 Kg/m3 |
| Solid content of MUF resin | 69.5% |
| Hardener (Ammonium sulfate) | 1% (40% w/w water solution) based on solid resin |
| Resinated particles with target moisture content | 14% (based on dry wood) |

TABLE 3

Type of flame retardant used as partial substitute in particle board manufacturing

| | |
|---|---|
| EcoChem | Commercially available flame retardant in powder form by EcoChem ® |
| Inventive composition 1 | Surface-reacted calcium carbonate powder SRCC1 impregnated with 18 wt. % (dry/dry) calcium chloride salt as described in example section 1.2.A having an equilibrium moisture content as shown for a rH of 50% in FIG. 2. |

The wood particles were placed in a drum blender (rotation speed: 110 U/min) and the adhesive was applied with a sparing nozzle (air pressure: 2 bars). After application of the adhesive/glue the resinated particles were mixed for 5 more minutes. Then, the flame retardant was added and the mixture was blended for 5 min. Hot-pressing of the particle boards was performed on a laboratory press (HLOP210, Höfer Presstechnik GmbH) at 220° C. After production, the boards were left to cool down overnight.

2.1.2 Fire Resistance Performance of Particle Board Comprising the Inventive Composition 1 as Flame Retardant Board samples were conditioned at a temperature of 23±2° C. and a relative humidity of 50±5% until they reached a constant mass according to DIN EN 13238.

The board samples were then tested according to ISO 5660-1, Prüfung zum Brandverhalten—Teil 1: Heat release rate (Cone-Calorimeter method) and smoke development (dynamic measurement), using a board sample with dimensions of 100 mm×100 mm and a heat flux density of 50 kW/m². Back and edges of samples were sealed with aluminum foil with thickness of 0.02 mm.

The test results for the heat release rate, total heat release rate and the total mass loss as shown in FIG. 3 and FIG. 4 demonstrate that the particle boards comprising the inventive composition 1 as flame retardant (P13 and P14) perform at least as good as the particle boards comprising the commercially available flame retardant (EcoChem).

2.2 Example 2

2.2.1 Manufacturing of medium density fiberboard comprising the inventive composition 1 as flame retardant Five different medium density fiberboards were provided for subsequent fire resistance tests (Table 4)

TABLE 4

Medium density variants for fire resistant tests

| MDF variant [abbreviation] | Comment |
|---|---|
| MDF comprising the inventive composition 1 [MCI] | Flame retardant is a surface-reacted calcium carbonate powder impregnated with 18 wt. % (dry/dry) calcium chloride salt as described in example section |

TABLE 4-continued

Medium density variants for fire resistant tests

| MDF variant [abbreviation] | Comment |
|---|---|
| MDF comprising EcoChem [Eco] | 1.2.A having an equilibrium moisture content as shown for a rH of 50% in FIG. 2. EcoChem is a commercially available flame retardant by EcoChem ® |
| MDF comprising CaCl$_2$ [CaCl2] | MDF manufactured with 50% CaCl$_2$ salt solution added directly to the fiber during manufacturing process in an amount corresponding to the CaCl$_2$ amount of the inventive composition 1 |
| REF [REF] | Control board without flame retardant |
| B1-MDF[B1 MDF | Commercially available MDF-E1-B1 panels (Tavapan) |

Industrial grade wood fibers were weighted and moisture content was determined. Fibers were placed in a Lüdige mixer where 15% (dry on dry fiber) resin MUF Kauramin 627 BASF with solid content of 68% was applied. In addition, Ammonium sulfate hardener and hydrophobing agent Hydrowax 730 von Sasol Wax was applied on fiber.

Flame retardant was added to the wood fibers as a substitute to the fibers in an amount of 15 wt. % for the MDF variant comprising EcoChem flame retardant and 35 wt. % for the MDF variant comprising the inventive composition 1 (dry/dry).

The fibers were pressed to a panel using the Höfer hot press using a pressing time of 12 s and a temperature of 220° C. to a final thickness of 15.2 mm and a target density of 700 kg/m2. B1 MDF board was a commercially available panel obtained on free market.

2.2.2 Fire resistance performance of MDF comprising the inventive composition 1 as flame retardant MDF samples were conditioned at a temperature of 23±2° C. and a relative humidity of 50±5% until they reached constant mass according to DIN EN 13238. The samples were then tested according to ISO 5660-1, Prüfung zum Brandverhalten—Teil 1: Heat release rate (Cone-Calorimeter Method) and smoke development (dynamic measurement), using sample with dimensions of 100 mm×100 mm and a heat flux density of 50 kW/m². Back and edges of samples were sealed with aluminum foil with thickness of 0.02 mm.

TABLE 5

Test results for MDF variants

| Sample type as defined in Table 4 | REF (2) | CaCl2 (2) | Eco (2) | MCI (1) | MCI (2) | B1-MDF (1) | B1-MDF (2) |
|---|---|---|---|---|---|---|---|
| Maximum extinction coefficient (1/m) | 0.4/0.4 | 1.5 | 1.4/0.5 | 0.9 | 0.9 | 1.5/1.4 | 1.4/0.6 |
| Total smoke release (m²/m²) | 40 | 70 | 590 | 90 | 80 | 1080 | 1040 |

The results in Table 5 and FIGS. 5 and 6 show a superior performance of the two MDF boards (MCI) comprising the inventive composition compared to the other tested boards Eco and B1 MDF. The superior performance is demonstrated by the lower extinction coefficient (which is a measure for smoke development). Overall, the MDF boards comprising the inventive composition as flame retardant are characterized by significantly lower smoke development when compared to the boards manufactured with the commercially available flame retardant (Eco) as well the commercially available B1 MDF board obtained on the market. In addition, carbon monoxide yield is significantly lower for the MDF boards comprising the inventive composition as flame retardant and is in the range for the control board (REF) while the values for the boards with the commercially available flame retardant (Eco) and for the commercially available board (B1 MDF) are almost double.

The invention claimed is:

1. A composition comprising:
   a first component being an inorganic mineral or mineral-like material having a porous structure, and
   a second component being a hygroscopic compound;
   wherein the inorganic mineral or mineral-like material is a calcium carbonate- and/or a magnesium carbonate-containing material;
   wherein the calcium carbonate-containing material is a surface-reacted calcium carbonate; and
   wherein the first component and the second component do not contain a silica- and/or silicate-containing material.

2. The composition according to claim 1, wherein the surface-reacted calcium carbonate is a reaction product of natural ground calcium carbonate or precipitated calcium carbonate with carbon dioxide and one or more H$_3$O$^+$ ion donors, wherein the carbon dioxide is formed in situ by the H$_3$O$^+$ ion donors treatment and/or is supplied from an external source.

3. The composition according to claim 1, wherein the second component is present in anhydrous form,
   or wherein the second component is present in an at least partially hydrated form and/or dissolved form.

4. The composition according to claim 1, wherein the hygroscopic compound is chosen from the group consisting of salts, polyalkylene glycols, polyols, silicon-containing compounds, urea, alpha-hydroxy acids, and polymers.

5. The composition according to claim 1, wherein the hygroscopic compound in its anhydrous form or partially hydrated form has a moisture pick-up susceptibility from 0.01 to 4.00 g[H$_2$O]/g[compound] at equilibrium capacity and at a relative humidity of 50% and at a temperature of +23° C. (±2° C.).

6. The composition according to claim 1, wherein the hygroscopic compound is present in an amount from 1.0 to 90 wt. %, calculated from the dry weight of the hydroscopic compound and based on the total dry weight of the inorganic mineral or mineral-like material and the hygroscopic compound.

7. The composition according to claim 1, wherein the inorganic mineral or mineral-like material has a median particle size d$_{50}$ from 1.0 μm to 100 μm, and/or a specific surface area of from 20 to 200 m²/g, as measured by the BET nitrogen method.

8. The composition according to claim 1, wherein the inorganic mineral or mineral-like material has an intra-particle intruded specific pore volume in the range from 0.1 to 2.3 cm$^3$/g, calculated from mercury porosimetry measurement.

9. The composition according to claim 1, wherein the composition has a total moisture content in the range from 1.0 to 90 wt. %, based on the total weight of the composition.

10. A process for preparing the composition of claim 1, the process comprising the steps of:
 a) providing a first component being an inorganic mineral or mineral-like material having a porous structure;
 b) providing a second component being a hygroscopic compound;
 c) mixing the first component of step a) with the second component of step b); and
 d) optionally drying the mixture obtained in step c).

11. The process according to claim 10, wherein step c) refers to one or more solid blending step(s), and the second component of step b) is provided in anhydrous form or in partially hydrated form, or wherein step c) refers to one or more impregnating step(s), and the first component of step a) is provided in solid form or in form of an aqueous suspension, and the second component of step b) is provided in liquid form.

12. The process according to claim 10, wherein the process further comprises the steps of:
 f) providing a coating and/or encapsulating agent;
 g) mixing the coating and/or encapsulating agent of step f) with the mixture obtained in step c) or d).

13. A composite material comprising a composition according to claim 1.

14. The composite material according to claim 13 further comprising one or more materials selected from polymers, organic fibres, binders or resins, or a combination of a resin and organic fibres.

15. A product comprising the composition according to claim 1.

16. The product according to claim 15, wherein the composition and/or the composite material is present throughout the whole product or is only present in at least one part of the product.

17. The product according to claim 16, wherein the product is a wood-based board, a humectant or a desiccant.

18. The composition of claim 1, wherein the hygroscopic compound is present in an amount from 10 to 40 wt. %, calculated from the dry weight of the hygroscopic compound and based on the total dry weight of the inorganic mineral or mineral-like material and the hygroscopic compound.

19. The process according to claim 10, wherein the hygroscopic compound is present in an amount from 10 to 40 wt. %, calculated from the dry weight of the hygroscopic compound and based on the total dry weight of the inorganic mineral or mineral-like material and the hygroscopic compound.

\* \* \* \* \*